US010661265B2

(12) United States Patent
Shukla et al.

(10) Patent No.: US 10,661,265 B2
(45) Date of Patent: May 26, 2020

(54) SEMICONDUCTOR-OXIDES NANOTUBES-BASED COMPOSITE PARTICLES USEFUL FOR DYE-REMOVAL AND PROCESS THEREOF

(71) Applicant: Council of Scientific & Industrial Research, New Delhi (IN)

(72) Inventors: Satyajit Vishnu Shukla, Kerala (IN); Hareesh Padinhattayil, Kerala (IN); Harsha Narayani, Kerala (IN); Manu Jose, Kerala (IN); Remya Karunakaran, Kerala (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/924,136

(22) Filed: Mar. 16, 2018

(65) Prior Publication Data
US 2018/0290135 A1 Oct. 11, 2018

Related U.S. Application Data

(63) Continuation of application No. 14/428,131, filed as application No. PCT/IN2014/000324 on May 12, 2014, now Pat. No. 9,993,814.

(30) Foreign Application Priority Data

May 24, 2013 (IN) .......................... 1563/DEL/2013

(51) Int. Cl.
  B01J 41/10 (2006.01)
  B01J 49/30 (2017.01)
  C09D 9/00 (2006.01)
  B82Y 40/00 (2011.01)
  B82Y 30/00 (2011.01)

(52) U.S. Cl.
  CPC ............... *B01J 41/10* (2013.01); *B01J 49/30* (2017.01); *C09D 9/00* (2013.01); *B82Y 30/00* (2013.01); *B82Y 40/00* (2013.01); *Y02W 10/37* (2015.05)

(58) Field of Classification Search
  None
  See application file for complete search history.

(56) References Cited

U.S. PATENT DOCUMENTS

2013/0105397 A1* 5/2013 Shukla ............... B01J 20/28009
210/663

2013/0220181 A1 8/2013 Bescher et al.

FOREIGN PATENT DOCUMENTS

| CN | 102718491 | * 10/2012 |
| WO | WO 2011086567 | * 7/2011 |
| WO | WO 2011/109421 A1 | 9/2011 |
| WO | WO 2011/111057 A1 | 9/2011 |

OTHER PUBLICATIONS

Wang et al. Magnetically separable g-Fe2O3/TiO2 nanotubes for photodegradation of aqueous methyl orange. Materials Research Bulletin 48 (2013) 785-789 (Year: 2013).*
Ortiz et al. A novel architectured negative electrode based on titania nanotube and iron oxide nanowire composites for Li-ion microbatteries. J. Mater. Chem, 2010, 20, 4041-4046 (Year: 2010).*
Harsha, N., et al., Hydrothermal Processing of Hydrogen Titanate/Anatase-Titania Nanotubes and Their Application as Strong Dye-Adsorbents, Journal of Nanoscience and Nanotechnology 11:1175-1187, 2011.
Hareesh, P., et al., Processing Fly Ash Stabilized Hydrogen Titanate Nano-Sheets for Industrial Dye-Removal Application, Journal of Hazardous Materials 229-230:177-82, 2012 (Chemical Abstract Service).
Ismail, H., et al., Curing Characteristics, Tensile Properties and Morphology of Palm Ash/Halloysite Nanotubes/Ethylene-Propylene-Diene Monomer (EPDM) Hybrid Composites, Polymer Testing 29(7):872-878, Oct. 2010.
Shukla, S., et al., Study of Mechanism of Electroless Copper Coating of Fly-Ash Cenosphere Particles, Applied Surface Science 181:35-50, 2001.
Shukla, S., et al., Synthesis and Characterization of Nanocrystalline Silver Coating of Fly Ash Cenosphere Particles by Electroless Process, Journal of Nanoscience and Nanotechnology 1:417-424, 2001.

(Continued)

*Primary Examiner* — Tanisha Diggs
(74) *Attorney, Agent, or Firm* — Knobbe, Martens, Olson & Bear LLP

(57) ABSTRACT

Semiconductor-Oxides Nanotubes-Based Composite Particles Useful for Dye-Removal and Process Thereof, has been described in this invention, which relates to an innovative method, involving an ion-exchange mechanism operating under the dark-condition in an aqueous solution, for the processing of innovative products consisting of the nanotubes of semiconductor-oxides deposited on (or anchored to or attached to) the surface of flyash particles and metal-oxide (magnetic and non-magnetic) nanoparticles. The resulting micro-nano and nano-nano integrated composite particles find potential application in the removal of an organic synthetic-dye from an aqueous solution and industry effluent via the surface-adsorption process, involving the ion-exchange and electrostatic-attraction mechanisms, operating in the dark-condition. The novel composite particles can be recycled for the next-cycle of dye-adsorption by decomposing the previously adsorbed-dye on their surfaces via an innovative approach involving the use of either noble-metal-deposited photocatalyst or a magnetically separable magnetic photocatalyst and an exposure to the ultraviolet (UV) or solar-radiation.

8 Claims, 17 Drawing Sheets

(56) References Cited

OTHER PUBLICATIONS

Shijitha, T., et al., Novel Electroless Process for Copper coating of Flyash Using Titania/Ultraviolet-Radiation/Metal Catalyst System, Applied Surface Science 255:6696-6704, 2009.

* cited by examiner

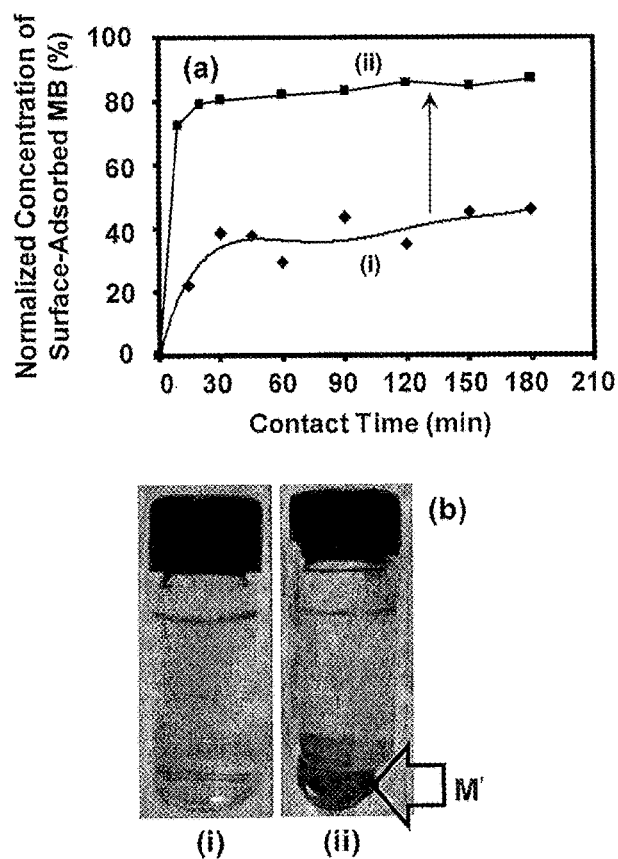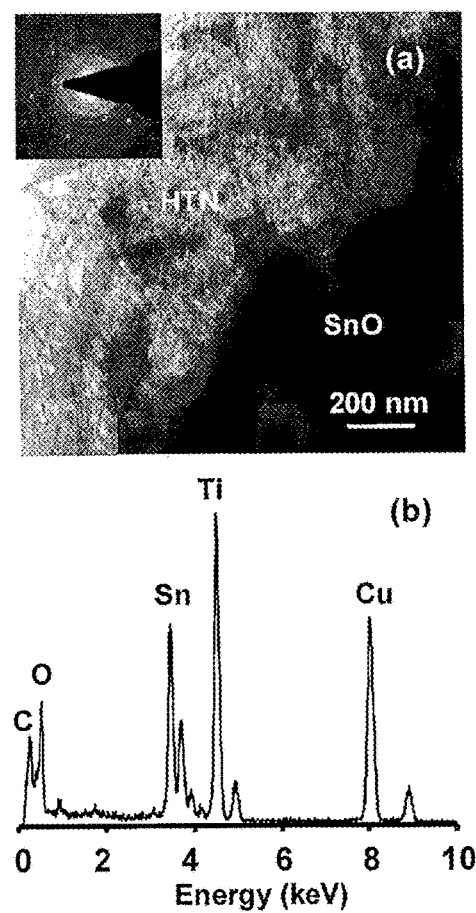
Figure 29
Figure 30

SEMICONDUCTOR-OXIDES NANOTUBES-BASED COMPOSITE PARTICLES USEFUL FOR DYE-REMOVAL AND PROCESS THEREOF

FIELD OF THE INVENTION

The present invention primarily relates to semiconductor oxide nanotubes based composite particles useful for dye removal and process thereof. Particularly, the present invention relates to Semiconductor Oxide Nanotubes-Flyash and Semiconductor Oxide Nanotubes-Metal Oxide Composite Particles, their Preparation, method for removal of dye using these composite particles. More particularly, the present invention relates to a method for Recycling of these composite particles in the Dye-Removal Application.

DESCRIPTION OF THE RELATED ART

Organic synthetic-dyes are extensively used in various industries such as the textile, leather tanning, paper production, food technology, agricultural research, light-harvesting arrays, photo-electrochemical cells, and hair-coloring. Due to their large-scale production, extensive use, and subsequent discharge of colored waste-waters, the toxic and non-biodegradable organic synthetic-dyes cause considerable environmental pollution and health-risk factors. Moreover, they also affect the sunlight penetration and oxygen solubility in the water-bodies, which in turn affect the under-water photosynthesis activity and life-sustainability. Moreover, due to their strong color even at lower concentrations, the organic synthetic-dyes generate serious aesthetic issues in the waste-water disposal. On the other hand, the toxic soluble heavy metal-cations cause serious problems to the ecosystem due to the serious health problems as a result of their accumulation in living tissues through the food-chain. Therefore, the removal of both highly stable organic synthetic-dyes and heavy metal-cations from the aqueous solutions and industry effluents is of a prime importance. Reference may be made to (V. K. Gupta, Suhas, "*Application of Low-Cost Adsorbents for Dye Removal—A Review*", Journal of Environmental Management 2009, 90, 2313-2342) wherein, the investigations conducted in the past using the different adsorbents such as orange peel, rice husk, coconut shell, carbon black, zeolites, carbon nanotubes, and flyash have been summarized. Typically, flyash (solid and hollow, also known as cenospheres) which is a waste by-product of thermal power plants, comprising the mixture of different metal-oxides such as silica ($SiO_2$, 50-85 wt. %), alumina ($Al_2O_3$, 5-20 wt. %), iron oxide ($Fe_2O_3$, 5-15 wt. %), and trace amount of oxides of other elements such as calcium, titanium, magnesium, and toxic heavy metals such as arsenic, lead, and cobalt, has been environmentally hazardous and pose major disposal and recycling problems worldwide. Reference may be made to (H. Liu, "Method to Produce Durable Non-Vitrified Fly Ash Bricks and Blocks", U.S. Pat. No. 7,998,268; B. R. Reddy, K. M. Ravi, "Methods of Formulating a Cement Composition", U.S. Pat. No. 7,913,757; R. L. Hill, C. R. Jolicoeur, R. Carmel, M. Page, I. Spiratos, T. C. To, "Sacrificial Agents for Fly Ash Concrete", U.S. Pat. No. 7,901,505) wherein, flyash has been traditionally used for landfill, manufacturing constructional materials such as cement, concrete, and bricks. Reference may be made to (K. Vasanth Kumar, V. Ramamurthi, S. Srinivasan, "*Modeling the Mechanism Involved During the Sorption of Methylene Blue onto Flyash*", Journal of Colloid and Interface Science 2005, 284, 14-21; M. Matheswaran, T. Karunanithi, "*Adsorption of Chrysiodine R by using Fly Ash in Batch Process*", Journal of Hazardous Materials 2007, 145, 154-161; D. Mohan, K. P. Singh, G. Singh, K. Kumar, "*Removal of Dyes from Wastewater Using Flyash a Low-Cost Adsorbent*", Industrial and Engineering Chemistry Research 2002, 41, 3688-3695; S. Kara, C. Aydiner, E. Demirbas, M. Kobya, N. Dizge, "*Modeling the Effects of Adsorbent Dose and Particle Size on the Adsorption of Reactive Textile Dyes by Fly Ash*", Desalination 2007, 212, 282-293) wherein, new industrial applications of flyash such as conductive/non-conductive filler in polymers, binder for agglomerating reactive mine tailings, manufacturing zeolites and microfiltration membranes, and adsorption of oil from aqueous solutions have been demonstrated. Flyash has also been utilized for the adsorption of different organic synthetic-dyes including remazol red RB 133, remazol blue, rifacion yellow HED, chrysoidine R, crystal violet, Rhodamine B, C.I. reactive black, 2-picoline, and acid red (AR1) from the aqueous solutions. Reference may be made to (M. Visa, C. Bogatu, A. Duta, "*Simultaneous Adsorption of Dyes and Heavy Metals from Multicomponent Solutions using Fly Ash*", Applied Surface Science 2010, 256, 5486-5491; S. Wang, M. Soudi, L. Li, Z. H. Zhu, "*Coal Ash Conversion into Effective Adsorbents for Removal of Metals and Dyes from Wastewater*", Journal of Hazardous Materials 2006, B133, 243-252; K. Ojha, N. C. Pradhan, A. N. Samanta, "*Zeolite from Fly Ash: Synthesis and Characterization*", Bulletin of Materials Science 2004, 27, 555-563) wherein, flyash has been utilized for the adsorption of heavy metal-cations such as $Sn^{2+}/Sn^{4+}$, $Fe^{2+}/Fe^{3+}$, $Pb^{2+}$, $Zn^{2+}$, $Cu^{2+}$, $Mn^{2+}$, $Ti^{4+}$, and others from aqueous solutions. The major advantage of using flyash for these applications is that it can be separated from the treated aqueous solutions via gravity settling. However, the major drawbacks of prior art-1 are as follows.

(1) Flyash has very low specific surface-area, and as a result, exhibits very low capacity for adsorbing organic synthetic-dyes and heavy metal-cations on its surface.

(2) Novel techniques to increase the specific surface-area of flyash, without affecting its typical spherical morphology and yet increasing its capacity for adsorbing organic synthetic-dyes and heavy metal-cations, are unknown.

(3) Adsorption of organic synthetic-dyes and heavy metal-cations on the surface of flyash generates large amount of sludge which creates further handling, disposal, and recycling issues which are at present not addressed satisfactorily.

(4) Novel value-added products based on the innovative surface-modifications of flyash for the potential applications, typically the removal of organic synthetic-dyes from the aqueous solutions, are currently lacking.

(5) Novel approaches for recycling the flyash as a catalyst in the dye-removal application, by decomposing the previously adsorbed-dye from its surface, are currently lacking.

Hence, it is vital to develop innovative approaches to enhance the specific surface-area of flyash to increase its capacity for the adsorption of organic synthetic-dyes and heavy metal-cations. Innovative approaches are also needed to be developed to decompose the previously adsorbed-dye from the surface of flyash to recycle it for the next-cycles of dye-adsorption as a catalyst Reference may be made to (S. Shukla, S. Seal, J. Akesson, R. Oder, R. Carter, K. Scammon, "*Study of Mechanism of Electroless Copper Coating of Flyash Cenosphere Particles*", Applied Surface Science 2001, 181, 35-50; S. Shukla, S. Seal, Z Rahaman, K. Scammon, *"Electroless Copper Coating of Cenospheres using Silver Nitrate Activator"*, Materials Letters 2002, 57, 151-156; S. Shukla, K. G. K. Warrier, K. V. Baiju, T. Shijitha, "Novel Surface-Modifications for Flyash and Industrial Applications Thereof", U.S. patent application Ser. No. 13/612,363 (Filed on 12 Sep. 2012), PCT Application No. PCT/IN2010/000735 (Filed on 11 Nov. 2010)) wherein, as far as flyash particles with the surface-adsorbed heavy metal-cations are concerned, the $Sn^{2+}$ cations adsorbed on the surface of flyash particles have been reported to be useful as sensitizer in an electroless metal (Cu/Ag)-coating of flyash particles using the Sn—Pd catalyst system. However, the major drawbacks of prior art-2 are as follows.

(6) Flyash particles with the surface-adsorbed $Sn^{2+}$ cations do not find other novel potential industrial applications.

(7) Flyash particles with the surface-adsorbed metal-cations, other than $Sn^{2+}$, are not suitable for the electroless metal-coating application.

(8) Flyash particles with the surface-adsorbed metal-cations, other than $Sn^{2+}$, have not been utilized for other potential applications.

Hence, the new potential industrial applications are required to be invented for improving the handling, disposal, and recycling issues of flyash with the surface-adsorbed heavy metal-cations. Reference may be made to (T. Kasuga, H. Masayoshi, "Crystalline Titania and Process for Producing the Same", U.S. Pat. No. 6,027,775; T. Kasuga, H. Masayoshi, "Crystalline Titania having Nanotube Crystal Shape and Process for Producing the Same", U.S. Pat. No. 6,537,517; N. Harsha, K. R. Ranya, S. Shukla, S. Biju, M. L. P. Reddy, K. G. K. Waffier, *"Effect of Silver and Palladium on Dye-Removal Characteristics of Anatase-Titania Nanotubes"*, Journal of Nanoscience and Nanotechnology 2011, 11, 2440-2449; N. Harsha, K. R. Ranya, K. B. Babitha, S. Shukla, S. Biju, M. L. P. Reddy, K. G. K. Waffier, *Hydrothermal Processing of Hydrogen Titanate/Anatase-Titania Nanotubes and Their Application as Strong Dye-Adsorbents"*, Journal of Nanoscience and Nanotechnology 2011, 11, 1175-1187; P. Hareesh, K. B. Babitha, S. Shukla, *"Processing Fly Ash Stabilized Hydrogen Titanate Nano-Sheets for Industrial Dye-Removal Application"*, Journal of Hazardous Materials 2012, 229-230, 177-182) wherein, the removal of heavy metal-cations and organic synthetic-dyes from the aqueous solutions via the surface-adsorption process, involving the ion-exchange and electrostatic-attraction mechanisms operating in the dark-condition, using the hydrothermally processed nanotubes of semiconductor-oxides such as the hydrogen titanate ($H_2Ti_3O_7$, HTN) and anatase-titania ($TiO_2$, ATN) have been demonstrated. The HTN and ATN possess very high specific surface-area typically about 100-200 times that of as-received flyash particles. Hence, the adsorption-capacity of HTN and ATN for adsorbing organic synthetic-dyes and heavy metal-cations is extremely large. However, the major drawbacks of prior art-3 are as follows.

(9) HTN and ATN cannot be separated quickly from the treated aqueous solution via gravity settling.

(10) HTN and ATN are non-magnetic; hence, they cannot be separated from the treated aqueous solution using an external magnetic field.

In view of the prior arts 1-3 and their limitations, it appears that there is a need for the development of novel composite materials which would exhibit higher capacities for surface-adsorbing the organic synthetic-dyes and heavy metal-cations and can be separated quickly from the treated aqueous solution via gravity-settling or using an external magnetic field. Flyash particles have lower dye-adsorption capacity but can be separated from the treated aqueous solution via the gravity settling. On the other hand, the nanotubes of semiconductor-oxides have higher dye-adsorption capacity but cannot be separated from the treated aqueous solution via the gravity settling. Hence, this suggests that a micro-nano composite material consisting of the nanotubes of semiconductor-oxides, such as the hydrothermally processed HTN and ATN, deposited on the surface of flyash particles can serve the purpose. Reference may be made to (S. Shukla, K. G. K. Warrier, M. R. Varma, M. T. Lajina, N. Harsha, C. P. Reshmi, "Magnetic Dye-Adsorbent Catalyst", U.S. patent application Ser. No. 13/521,641 (Filed on 11 Jul. 2012), PCT Application No. PCT/IN2010/000198 (Filed on 29 Mar. 2010); L. Thazhe, A. Shereef, S. Shukla, R. Pattelath, M. R. Varma, K. G. Suresh, K. Patil, K. G. K. Waffier, *"Magnetic Dye-Adsorbent Catalyst: Processing, Characterization, and Application"*, Journal of American Ceramic Society 2010, 93(11), 3642-3650) wherein, the magnetic dye-adsorbent catalyst, consisting of the "core-shell" nanocomposite particles with the core of a magnetic ceramic particle and the shell of nanotubes of semiconductor-oxide, has been developed via the hydrothermal treatment of magnetic photocatalyst (processed via the Stober and sol-gel methods) followed by typical washing-cycles, to facilitate the quick settling of HTN and ATN using an external magnetic field. Reference may be made to (C. C. Sheng, L. T. Gui, C. X. Hua, L. L. Wu, L. Q. Cheng, X. Qing, N. Z. Wu, *"Preparation and Magnetic Property of Multi-Walled Carbon Nanotube/$\alpha$-$Fe_2O_3$ Composites"*, Transactions of Nonferrous Metals Society of China, 2009, 19, 1567-1571; E. Santala, M. Kernell, M. Leskelä, M. Ritala, *"The Preparation of Reusable Magnetic and Photocatalytic Composite Nanofibers by Electrospinning and Atomic Layer Deposition"*, Nanotechnology 2009, 20, 035602; S. K Mohapatra, S. Banerjee, M. Misra, *"Synthesis of $Fe_2O_3/TiO_2$ Nanorod—Nanotube Arrays by Filling $TiO_2$ Nanotubes with Fe"*, Nanotechnology 2008, 19 315601, Fei Liu, Yinji Jin, Hanbin Liao, Li Cai, Meiping Tong, Yanglong Hou, *"Facile Self-Assembly Synthesis of Titanate/$Fe_3O_4$ Nanocomposites for the Efficient Removal of $Pb^{2+}$ from Aqueous Systems"*, Journal of Physical Chemistry A, DOI: 10.1039/c2ta00099g) wherein, the magnetic nanocomposites having the morphology other than the "core-shell" morphology, consisting of magnetic nanoceramic particles deposited on the surface of $TiO_2$ nanotubes, have also been processed via different techniques including the precipitation-calcination, electrospinning-atomic layer deposition, pulsed electrodeposition, and self-assembly process. However, the major drawbacks of prior art-4 are as follows.

(11) The combination of sol-gel and hydrothermal methods is not applicable to the flyash particles since $SiO_2$, a major constituent of flyash particles, is soluble in a highly alkaline aqueous solution involved in the hydrothermal treatment.

(12) Innovative techniques for depositing the nanotubes of semiconductor-oxides on the surface of flyash are not known.

(13) Other techniques including the precipitation-calcination, electrospinning-atomic layer deposition, and pulsed electrodeposition are not suitable for depositing the nanotubes of semiconductor-oxides on the surface of flyash.

(14) The self-assembly process produces the magnetic nanocomposite with the magnetic nanoparticles uniformly dispersed on the surface of semiconductor-oxides nanotubes which reduces the potential sites on the surface of nanotubes required for the adsorption of dye molecules and the metal-cations from the aqueous solutions. Moreover, the self-assembly method also requires the use of an acid for obtaining the said morphology.

(15) Innovative techniques for attaching or anchoring the HTN or ATN to the surface of magnetic nanoparticles, typically at their short-edges (tube-openings), are not currently available. As a result, the said product cannot be synthesized using any of the existing processes.

As a consequence, there is an urgent need to develop novel methods for depositing the nanotubes of semiconductor-oxides on the surface of flyash particles. Since the flyash particles are non-magnetic, they cannot be separated from an aqueous solution using an external magnetic field. Hence, it is also essential to demonstrate the deposition of the nanotubes of semiconductor-oxides on the surface of magnetic metal-oxide nanoparticles (instead of flyash) by attaching or anchoring them to the magnetic particle-surface using the same innovative mechanism which is employed in the case of flyash particles. Thus, the novel composite materials consisting of the nanotubes of semiconductor-oxides deposited on the surface of both the non-magnetic flyash and attached to (or anchored to) the surface of magnetic metal-oxide nanoparticles, via an innovative approach, would provide new ways of efficiently treating the aqueous solutions containing the harmful organic synthetic-dyes and heavy metal-cations. It would also provide new ways for the separation and recycling the flyash, without and with the surface-adsorbed metal-cations, as value-added products for the dye-removal application.

As mentioned above, flyash (without and with the surface-adsorbed metal-cations), HTN, ATN, and magnetic composites can be used as dye-adsorbents. In order to recycle these dye-adsorbents as catalysts for the next-cycles of dye-adsorption, it is necessary to remove the previously-adsorbed dye from their surfaces. Reference may be made to (Z. Geng, Y. Lin, X. Yu, Q. Shen, L. Ma, Z. Li, N. Pan, X. Wang, "*Highly Efficient Dye Adsorption and Removal: A Functional Hybrid of Reduced Graphene Oxide-$Fe_3O_4$ Nanoparticles as an Easily Regenerative Adsorbent*", *Journal of Materials Chemistry* 2012, 22, 3527-3535; M. Visa, L. Andronic, D. Lucaci, A. Duta, "*Concurrent Dyes Adsorption and Photo-Degradation on Fly Ash Based Substrates*", *Adsorption* 2011, 17, 101-108; J.-T. Li, B. Bai, Y.-L. Song, "*Degradation of Acid Orange 3 in Aqueous Solution by Combination of Fly Ash/$H_2O_2$ and Ultrasound Irradiation*", *Indian Journal of Chemical Technology* 2010, 17, 198-203) wherein, annealing under the moderate conditions (at 400° C. for 1 h) for removing the previously adsorbed Rhodamine B dye from the surface of reduced graphene oxide-$Fe_3O_4$ composite has been reported. The mechanical mixture of flyash and $TiO_2$ powders has been employed for the decomposition of organic synthetic-dye on the surface of flyash under the ultraviolet (UV)-radiation exposure. The recycling of flyash via the simultaneous dye-adsorption on its surface and dye-degradation using the combination of $H_2O_2$ and ultrasound-irradiation (Fenton-like reaction) has been reported. Reference may be made to (S. Shukla, K. G. K. Waffier, K. B. Babitha, "Methods for Decomposition of Organic Synthetic-Dyes using Semiconductor-Oxides Nanotubes via Dark-Catalysis", PCT Application No. PCT/IN2013/000319 (Filed on 17 May 2013), Indian Patent Application 2555DEL2012 (Filed on 17 Aug. 2012)) wherein, the combination of hydrothermally processed HTN or ATN and $H_2O_2$ has been used to degrade the previously adsorbed organic synthetic-dye in an aqueous solution, typically in the dark-condition, without the use of external-irradiation and external power-source. In such case, the dye-decomposition is achieved through the generation and attack of both the free hydroxyl-radicals (OH.) and super-oxide-ions ($O_2^-$) which are generated by the HTN and ATN in the presence of $H_2O_2$. Reference may be made to (M. S. Yalfani, S. Contreras, F. Medina, J. Sueiras, "*Direct Generation of Hydrogen Peroxide from Formic Acid and $O_2$ using Heterogeneous Pd/α-$Al_2O_3$ Catalysts*", *Chemical Communications*, 2008, 3885-3887) wherein, the Pd-deposited on alumina ($Al_2O_3$) substrate has been utilized to generate $H_2O_2$ in-situ using the formic acid (HCOOH) and dissolved oxygen ($O_2$) which can be utilized for the decomposition of organic synthetic-dyes in an aqueous solution via the Fenton/Fenton-like reactions. However, the major drawbacks of prior-art 5 are as follows.

(16) Innovative techniques for removing the previously adsorbed-dye from the surface of various adsorbents mentioned above, for recycling them as catalysts, are unknown.

(17) The annealing treatment, conducted even under the moderate conditions, can destroy the nanotube-morphology and the phase structure;

(18) Flyash and $TiO_2$ cannot be separated, after the dye-decomposition, from their mechanical mixture since both are non-magnetic; hence, the recycling of flyash is not possible from the mechanical mixture of flyash and $TiO_2$ powders for reusing the former separately for the dye-adsorption process conducted in the dark-condition.

(19) The use of a magnetic photocatalyst, consisting of the "core-shell" nanocomposite particles with the core of a magnetic ceramic particle, an intermediate insulating layer of silica ($SiO_2$) or an organic polymer, and the shell of nanocrystalline particles of semiconductor-oxide photocatalyst such as anatase-$TiO_2$, has never been reported for the recycling of dye-adsorbents typically the flyash without and with the surface-modifications.

(20) The adsorbents such as the HTN and ATN cannot be recycled via the mechanically mixing and UV-exposure method involving the use of $TiO_2$ photocatalyst since the nanocrystalline $TiO_2$ particles have a tendency to get attached to the HTN and ATN via an ion-exchange mechanism (which has been disclosed here) which reduces the total number of potential-sites available for the dye-adsorption for a given amount of dye-adsorbent. The latter issue becomes severe with the increasing number of dye-adsorption cycles.

(21) The recycling of flyash particles using the combination of $H_2O_2$ (Fenton-like reactions) and ultrasound-irradiation is a costlier process.

(22) The efficient methods to recycle the flyash, in the dye-removal application, without the use of external-power source are not known.

Hence, it is essential to develop simpler, easier, cost-effective, efficient, and innovative processes to remove or decompose the previously adsorbed-dye from the surface of dye-adsorbents, typically the flyash without and with the surface-modifications, to make their recycling possible in the dye-removal application.

OBJECTIVE OF THE INVENTION

The main objective of the present invention is to provide semiconductor-oxides nanotubes-based composite particles useful for dye-removal and process thereof.

Another objective of the present invention is to provide semiconductor-oxide nanotubes-based composite particles typically related to the potential application concerning the removal of organic synthetic-dyes from the aqueous solutions via the surface-adsorption process, involving the ion-exchange and electrostatic-attraction mechanisms, operating in the dark-condition.

Still another objective of the present invention is to provide the processes for the preparation of semiconductor-oxide nanotubes-flyash and semiconductor-oxide nanotubes-metal oxide composite particles.

Yet another objective of the present invention is to provide innovative products, and processes for the recycling of flyash, with the surface-adsorbed metal-cations, as a value-added waste by-product.

Yet another objective of the present invention is to provide a method involving both the surface-sensitization of flyash particles (by adsorbing the cations (either metal-ions ($M^{n+}$) or protons ($H^+$)) and an ion-exchange mechanism operating under the dark-condition in an aqueous solution for the processing of novel semiconductor-oxide nanotubes-flyash composite particles.

Yet another objective of the present invention is to provide the optimum parameters for the processing of semiconductor-oxide nanotubes-flyash composite particles via a method involving both the surface-sensitization of flyash particles and an ion-exchange mechanism operating under the dark-condition in an aqueous solution.

Yet another objective of the present invention is to provide the doped-nanotubes of semiconductor-oxides to increase the dye-adsorption capacity of semiconductor-oxide nanotubes-flyash composite particles for the dye-removal application.

Yet another objective of the present invention is to provide a process for the preparation of semiconductor-oxide nanotubes-metal oxide nanocomposite particles which does not involve the surface-sensitization step.

Yet another objective of the present invention is to provide a method for decomposing the previously adsorbed-dye on the surface of as-received flyash particles or the semiconductor-oxide nanotubes-flyash composite particles (non-magnetic), by using the combination of a magnetic photocatalyst and an exposure to the UV or solar-radiation to recycle the as-received flyash particles or the semiconductor-oxide nanotubes-flyash composite particles as catalyst for the repeated cycles of dye-adsorption conducted in the dark-condition.

Yet another objective of the present invention is to provide a method for decomposing the previously adsorbed-dye on the surface of semiconductor-oxide nanotubes-metal oxide magnetic nanocomposite particles, by using the combination of noble-metal-deposited nanocrystalline anatase-$TiO_2$ photocatalyst (non-magnetic) and an exposure to the UV or solar-radiation, to recycle the magnetic nanocomposite as a catalyst for the repeated cycles of dye-adsorption conducted in the dark-condition.

Yet another objective of the present invention is to provide the semiconductor-oxide nanotubes-flyash composite particles which are magnetic in nature.

Yet another objective of the present invention is to provide a process for the preparation of semiconductor-oxide nanotubes-flyash composite particles which are magnetic in nature.

Yet another objective of the present invention is to provide the semiconductor-oxide nanotubes-flyash composite particles which are magnetic in nature for the dye-removal application.

SUMMARY OF THE INVENTION

Accordingly, the present invention provides a composite particle which comprises,
(i) metal-cations ($M^{n+}$) or protons-sensitized flyash particle of diameter in the range of 0.3-100 μm,
(ii) nanotubes of semiconductor-oxides deposited on the surface of metal-cations or protons-sensitized flyash particle.

In one embodiment of the present invention the nanotubes are in the range of 1-15 wt. %, the meal-cations ($M^{n+}$) or protons in the range of 1-80 wt. %, and the balance being the weight of flyash particles.

In an embodiment of the present invention the flyash particle consists of the mixture of silica ($SiO_2$, 50-85 wt. %), alumina ($Al_2O_3$, 5-20 wt. %), iron oxide ($Fe_2O_3$, 5-15 wt. %), and trace amount of oxides of other elements selected from calcium, titanium, magnesium, and toxic heavy metals selected from arsenic, lead, and cobalt.

In another embodiment of the present invention the metal-cations ($M^{n+}$) are selected from the group consisting of $Sn^{2+}/Sn^{4+}$, $Fe^{2+}/Fe^{3+}$, $Pb^{2+}$, $Zn^{2+}$, $Cu^{2+}$, $Mn^{2+}$, and $Ti^{4+}$.

Still in another embodiment of the present invention the nanotubes of semiconductor-oxides are selected from the group consisting of hydrothermally processed hydrogen titanate (HTN, $H_2Ti_3O_7$ or the lepidocrocite-type), anatase-$TiO_2$ (ATN), and Ag-doped ATN.

Still in another embodiment of the present invention the nanotubes of semiconductor-oxides are optionally attached to the magnetic metal-oxide nanoparticles at the short-edges (tube-openings) and/or surface-deposited with the magnetic metal-oxide nanoparticles which are selected from the group consisting of γ-$Fe_2O_3$, $Fe_3O_4$, $CoFe_2O_4$, $NiFe_2O_4$, $MnFe_2O_4$, Co, Fe, and Ni.

Still in another embodiment of the present invention a process for the preparation of a composite particle, wherein the said process comprises the steps of,
(a) dissolving a metal-salt (1-70 g·l$^{-1}$) in water having initial solution-pH~1-2 adjusted using the 0.1-1 M HCl solution under continuous stirring for 30-300 min at temperature ranging between 20-30° C., followed by suspending flyash particles (1-25 g·l$^{-1}$) into it under continuous stirring for 30-300 min at temperature ranging between 20-30° C. to obtain the suspension of metal-cations ($M^{n+}$) sensitized flyash particles;
(b) optionally suspending flyash particles (1-25 g·l$^{-1}$) in 50-250 ml of water having the initial solution-pH~1-2 adjusted using the 0.1-1 M HCl solution under continuous stirring for 30-300 min at temperature ranging between 20-30° C. to obtain the suspension of protons-sensitized flyash particles;
(c) adding hydrothermally processed nanotubes of semiconductor-oxides (0.1-5 g·l$^{-1}$) to the suspension of cations ($M^{n+}$) or protons-sensitized flyash particles as obtained in step (a) or in step (b), followed by sonicating the suspension for 5-30 min;
(d) stirring the suspension obtained in step (c) continuously for 30-300 min at temperature ranging between 20-30° C. to obtain the composite of semiconductor-oxide nanotubes and cations ($M^{n+}$) or protons-sensitized flyash particles;
(e) separating the composite particles as obtained in step (d) using a centrifuge operated at 2000-4000 rpm or an external magnetic field, followed by washing the composite particles using water for 30 min-2 h multiple-times till the pH of filtrate remains unchanged or neutral, followed by separation and drying the composite particles in an oven at 70-90° C. for 10-15 h.

Still in another embodiment of the present invention the metal-salt used in step (a) is selected from the group consisting of chloride, nitrate, sulfate-salts of $Sn^{2+}/Sn^{4+}$, $Fe^{2+}/Fe^{3+}$, $Pb^{2+}$, $Zn^{2+}$, $Cu^{2+}$, $Mn^{2+}$, $Ti^{4+}$, and others.

Still in another embodiment of the present invention a nanocomposite particle which comprises,
(i) metal-oxide nanoparticles in the range of 5-70 wt. %;
(ii) nanotubes of semiconductor-oxides in the range of 30-95 wt. % attached to the surface of metal-oxide nanoparticles at the short-edges (tube-openings).

Still in another embodiment of the present invention the metal-oxide nanoparticles are selected from the group consisting of $\gamma$-$Fe_2O_3$ (magnetic), $Fe_3O_4$ (magnetic), $SnO/SnO_2$, PbO, ZnO, CuO, MnO, and $TiO_2$.

Still in another embodiment of the present invention the nanotubes of semiconductor-oxides are selected from the group consisting of hydrothermally processed hydrogen titanate (HTN, $H_2Ti_3O_7$ or the lepidocrocite-type) and anatase-$TiO_2$ (ATN).

Still in another embodiment of the present invention a process for the preparation of a nanocomposite particle, wherein the said process comprises the steps of,
(A) Dispersing the 0.5-10 g·l$^{-1}$ of metal-oxide nanoparticles in water having the neutral solution-pH (~6.5-7.5) under continuous stirring for 5-30 min at temperature in the range of 20-30° C.;
(B) adding 0.5-10 g·l$^{-1}$ of hydrothermally processed nanotubes of semiconductor-oxides in the suspension obtained in step (A) under continuous stirring for 5-30 min at temperature in the range of 20-30° C., followed by sonicating the suspension for 5-30 min, subsequently stirring the suspension continuously for 1-10 h in the dark-condition to obtain the semiconductor-oxide nanotubes-metal oxide nanocomposite particles;
(C) separating the semiconductor-oxide nanotubes-metal oxide nanocomposite particles using a centrifuge operated at 2000-4000 rpm or an external magnetic field, followed by washing the nanocomposite particles using water for 30 min-2 h till the pH of filtrate remains unchanged or neutral, followed by separation and drying the nanocomposite particles in an oven at 70-90° C. for 10-15 h.

Still in another embodiment of the present invention The composite and nanocomposite particles are useful for the application involving the dye-removal from an aqueous solution and industry-effluent via the surface-adsorption mechanism operating in the dark-condition.

Still in another embodiment of the present invention a process for the surface-cleaning and the recycling of composite/nanocomposite particles after the adsorption of an organic synthetic-dye from an aqueous solution via the surface-adsorption mechanism operating in the dark-condition, comprising the steps of,
a. suspending 1-30 g·l$^{-1}$ of composite/nanocomposite particles having the surface-adsorbed organic synthetic-dye (0.1-3 mg·g$^{-1}$) in water under continuous stirring for a period ranging between 5-30 min at temperature ranging between 20-30° C.;
b. suspending a photocatalyst (10-60 wt. % of total weight of suspended solid particles) selected from the group of nanocrystalline anatase-$TiO_2$-coated $SiO_2$/$\gamma$-$Fe_2O_3$ magnetic photocatalyst or the noble-metal-deposited nanocrystalline anatase-$TiO_2$ in the suspension obtained in step (a) under continuous stirring, followed by sonicating the suspension for 5-30 min, subsequently stirring the suspension continuously under the UV or solar-radiation exposure for 1-10 h;
c. centrifuging the solution at 2000-4000 rpm to separate the composite/nanocomposite particles and photocatalyst together, followed by washing using water for 30 min-2 h multiple-times till the pH of filtrate remains unchanged or neutral;
d. separating the photocatalyst particles from the surface-cleaned composite/nanocomposite particles using an external magnetic field;
e. drying both the photocatalyst particles and composite/nanocomposite particles in an oven at 70-90° C. for 10-15 h for the reuse.

represents calculated variation in $q_e$ as a function of initial MB dye concentration obtained for the HTN-flyash composite.

Figure 10:
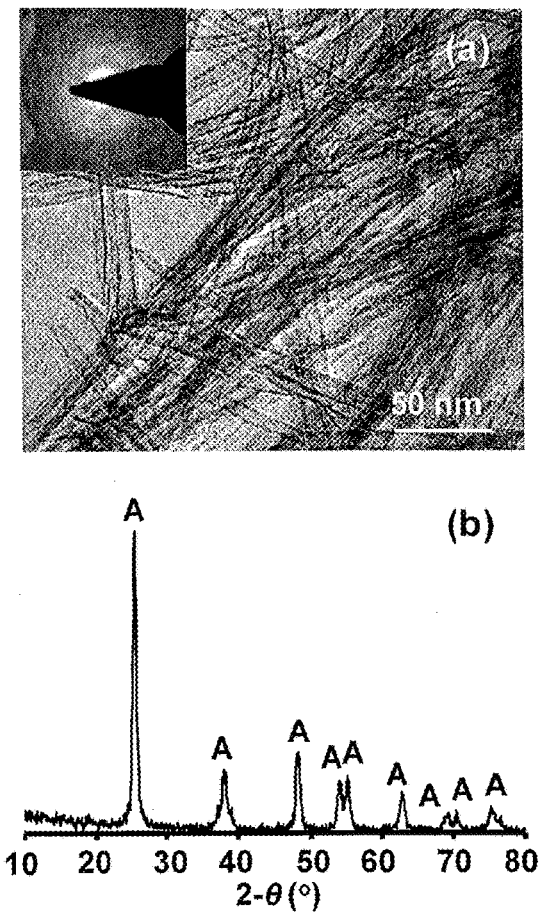

FIG. 10 represents the TEM image (a) and XRD pattern (b) of hydrothermally processed ATN. The precursor used for the hydrothermal processing of ATN is the nanocrystalline anatase-$TiO_2$ particles processed via acetic-acid (catalyst) modified sol-gel method. In (a), the inset shows the corresponding SAED pattern. In (b), A represents the anatase-$TiO_2$.

Figure 11:
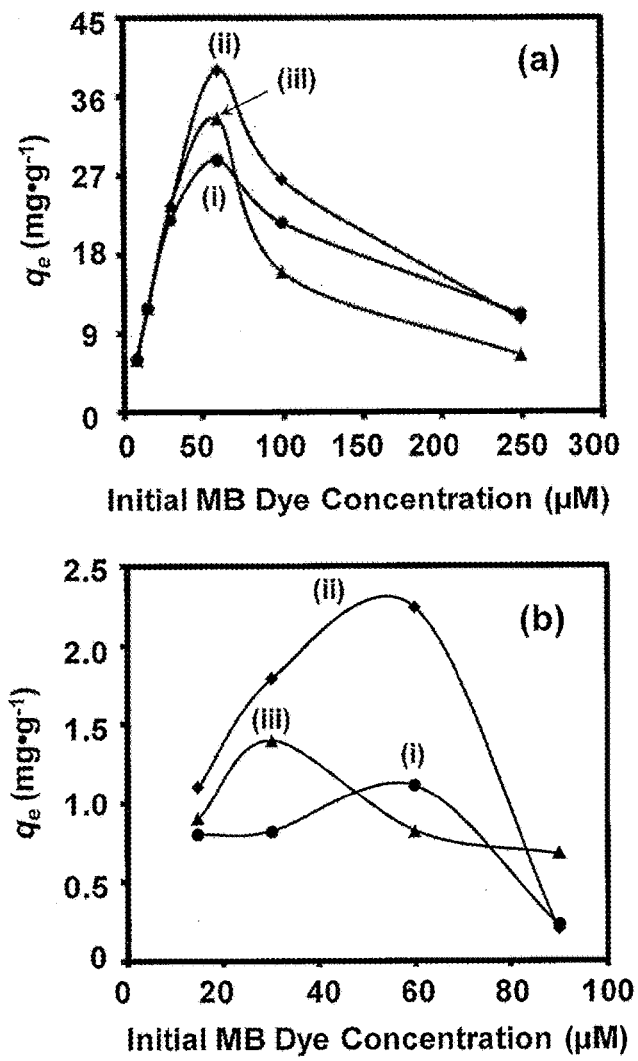

FIG. 11 represents the variation in $q_e$ as a function of initial MB dye concentration as obtained for the hydrothermally processed Ag-doped ATN (a) and the Ag-doped ATN-flyash composite particles (b) having different values of Ag/Ti mole-ratio—0 (i), 1 (ii), and 5% (iii).

Figure 12:
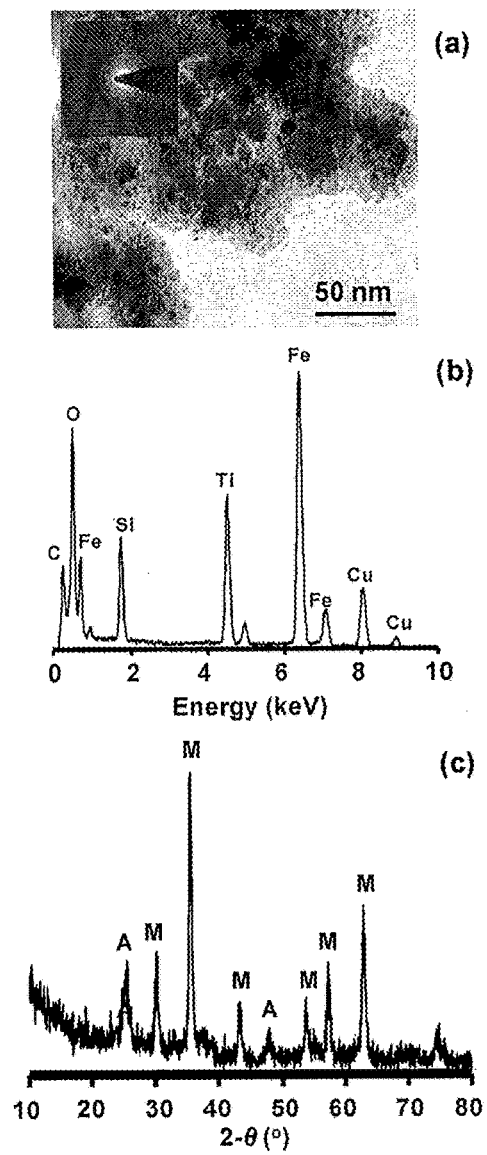

FIG. 12 represents the TEM image (a), EDX spectrum (b), and XRD pattern (c) obtained using the conventional anatase-$TiO_2$-coated (cycle-5) $SiO_2/\gamma$-$Fe_2O_3$ magnetic photocatalyst (containing 26 wt. % $TiO_2$, 25 wt. % $\gamma$-$Fe_2O_3$, and 49 wt. % $SiO_2$) processed using the combination of modified-Stober and conventional sol-gel methods. A and M represent the anatase-$TiO_2$ and $\gamma$-$Fe_2O_3$ (maghemite) structures.

Figure 13:
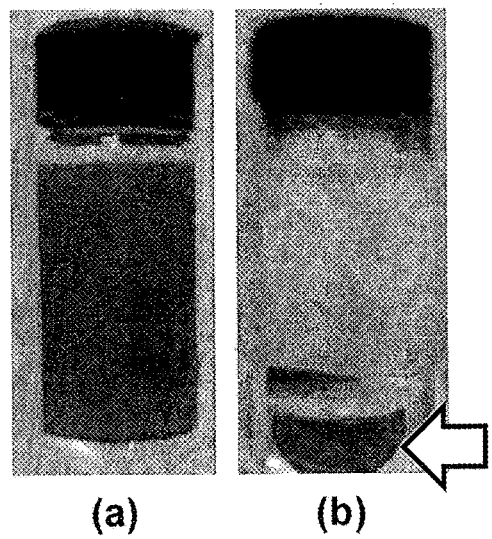

FIG. 13 represents the effect of a moderate external magnetic field on the magnetic separation of anatase-$TiO_2$-coated (cycle-5) $SiO_2/\gamma$-$Fe_2O_3$ magnetic photocatalyst (containing 26 wt. % $TiO_2$, 25 wt. % $\gamma$-$Fe_2O_3$, and 49 wt. % $SiO_2$) from an aqueous solution. (a) and (b) show the digital photographs taken after the addition of magnetic photocatalyst to an aqueous solution without and with the presence of a moderate external magnetic field (holding time of 5 min). In (b), the arrow at the right-side bottom-corner shows the position of an external magnet.

Figure 14:
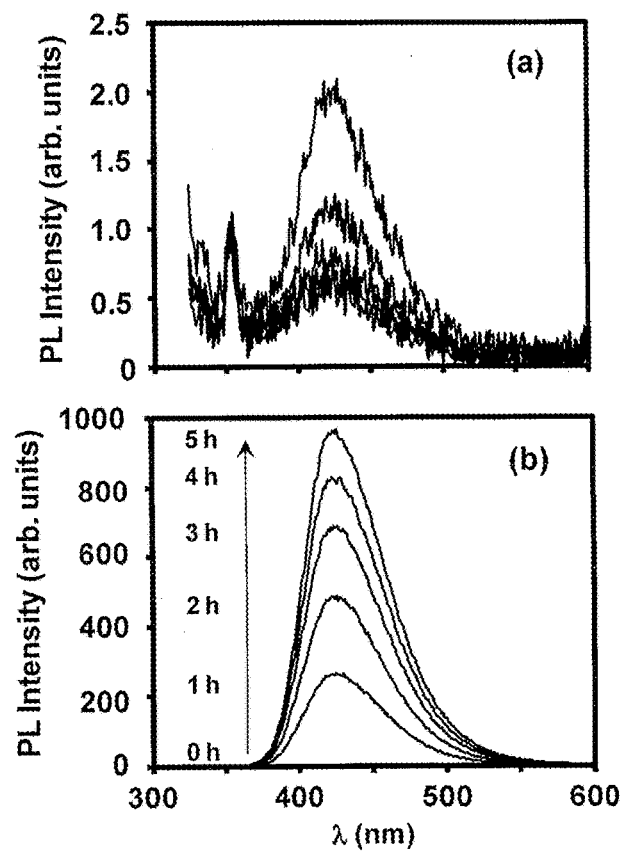

FIG. 14 represents the variation in the PL intensity associated with the formation of 2-hydroxyterepthalic acid as a function of solar-radiation exposure time as obtained for the as-received flyash particles (a) and anatase-$TiO_2$-coated (cycle-5) $SiO_2/\gamma$-$Fe_2O_3$ magnetic photocatalyst (containing 26 wt. % $TiO_2$, 25 wt. % $\gamma$-$Fe_2O_3$, and 49 wt. % $SiO_2$) (b). The excitation wavelength is ~315 nm.

Figure 15:
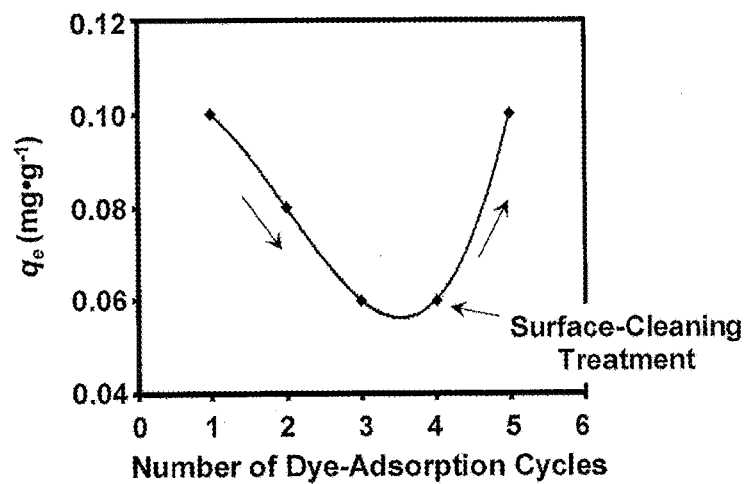

FIG. 15 represents the variation in $q_e$, obtained using the as-received flyash particles, as a function of number of dye-adsorption cycles conducted in the dark-condition. The dye-adsorption cycles 1-4 are conducted before and cycle-5 is conducted after applying the surface-cleaning treatment, conducted under the solar-radiation exposure, to decompose the previously adsorbed-dye from the surface of as-received flyash particles.

Figure 16:
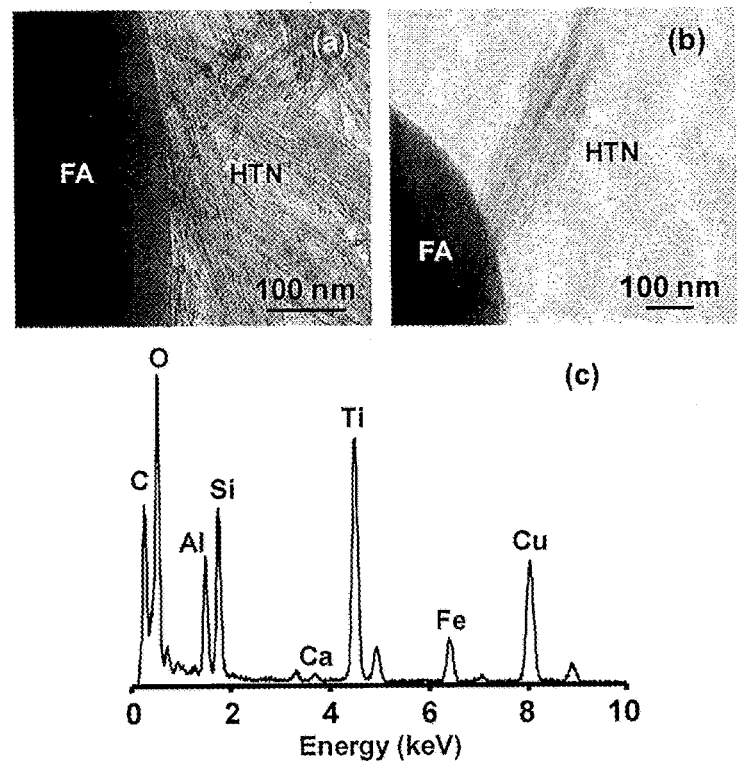

FIG. 16 represents the high magnification TEM images (a,b) and EDX spectrum (c) of micro-nano integrated HTN-flyash composite particles. (a,b) show the interphase regions between the flyash particle and surface-adsorbed HTN processed via an ion-exchange mechanism, operating under the dark-condition in an aqueous solution, using the $Fe^{3+}$ cations for the surface-sensitization of as-received flyash particles. The HTN-flyash composite particles (non-magnetic) contain 20 wt. % Fe and 7 wt. % HTN (balance being the weight of flyash particles).

Figure 17:
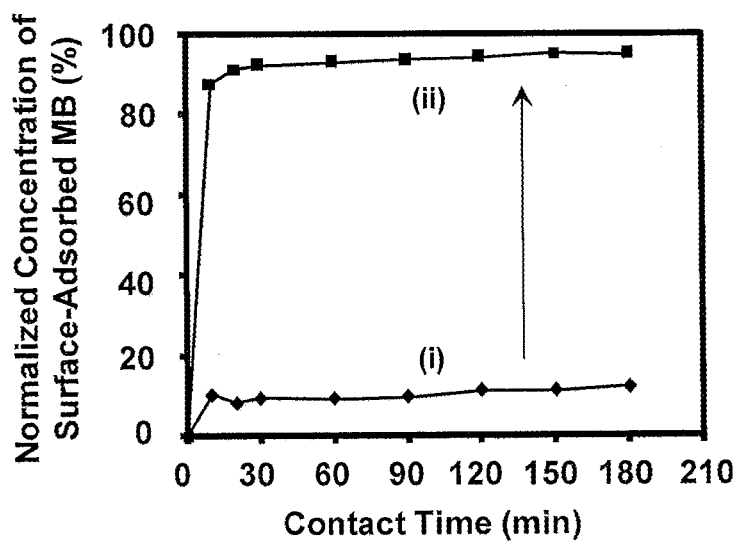

FIG. 17 represents the variation in the normalized concentration of surface-adsorbed MB dye as obtained for the as-received flyash particles (i) and HTN-flyash composite particles (non-magnetic) (ii). The latter is processed by using the $Fe^{3+}$ cations for the surface-sensitization of as-received flyash particles. The initial MB dye concentration and the initial solution-pH are 30 µM and ~7.5. The HTN-flyash composite particles (non-magnetic) contain 20 wt. % Fe and 7 wt. % HTN (balance being the weight of flyash particles).

Figure 18:
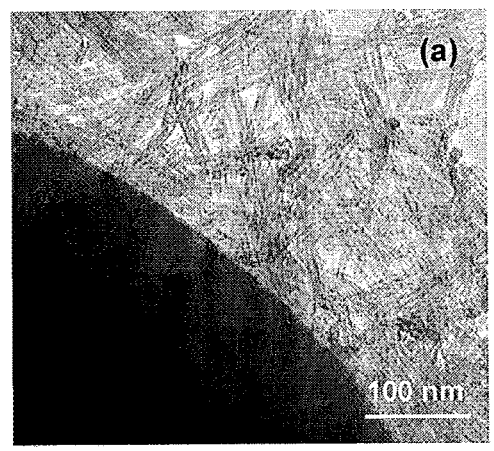
Figure 18:
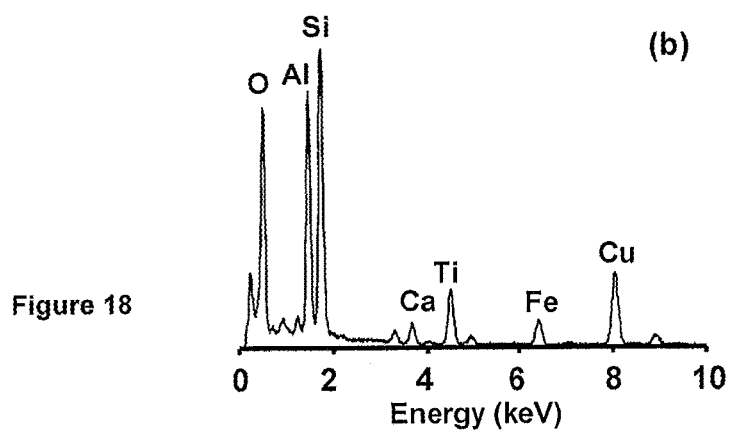

FIG. 18 represents the TEM image (a) and EDX spectrum (b) obtained using the HTN-flyash composite particles processed using the $H^+$ ions, instead of metal-cations ($M^{n+}$), for the surface-sensitization of as-received flyash particles. The HTN-flyash composite particles (non-magnetic) containing ~2 wt. % H and 9 wt. % HTN (balance being the weight of flyash particles).

Figure 19:
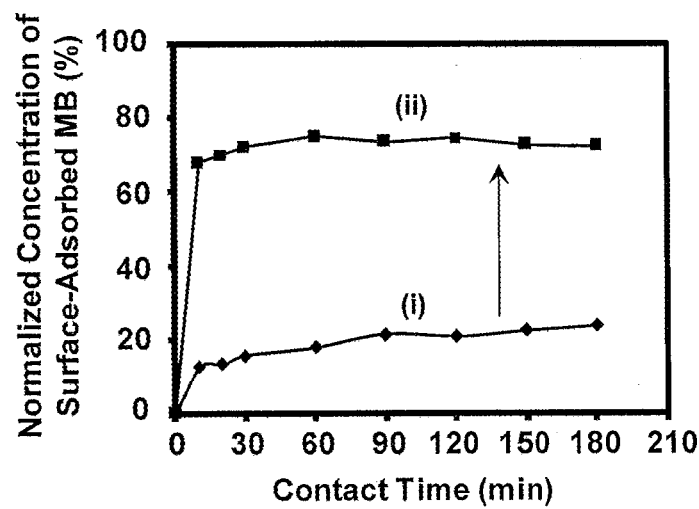

FIG. 19 represents the variation in the normalized concentration of surface-adsorbed MB dye as a function of contact time as obtained for the as-received flyash particles (i) and HTN-flyash composite particles (non-magnetic) (ii). The latter is processed using the $H^+$ ions, instead of metal-cations ($M^{n+}$), for the surface-sensitization of as-received flyash particles. The initial MB dye concentration and initial solution-pH are 15 µM and ~7.5. The HTN-flyash composite particles (non-magnetic) containing ~2 wt. % H and 9 wt. % HTN (balance being the weight of flyash particles).

Figure 20:
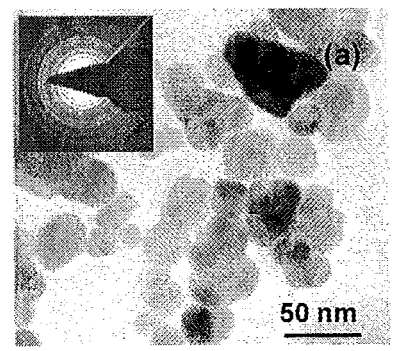
Figure 20:
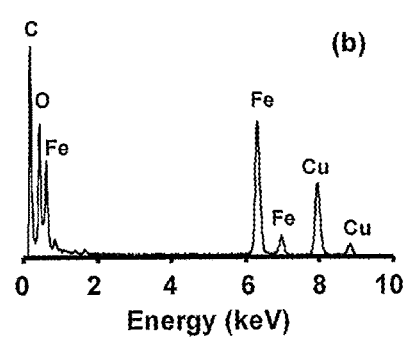
Figure 20:
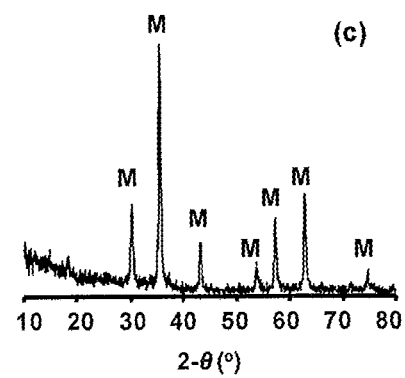

FIG. 20 represents the TEM image (a), EDX spectrum (b), and XRD pattern (c) obtained using the as-received $\gamma$-$Fe_2O_3$ (maghemite) magnetic particles.

Figure 21:
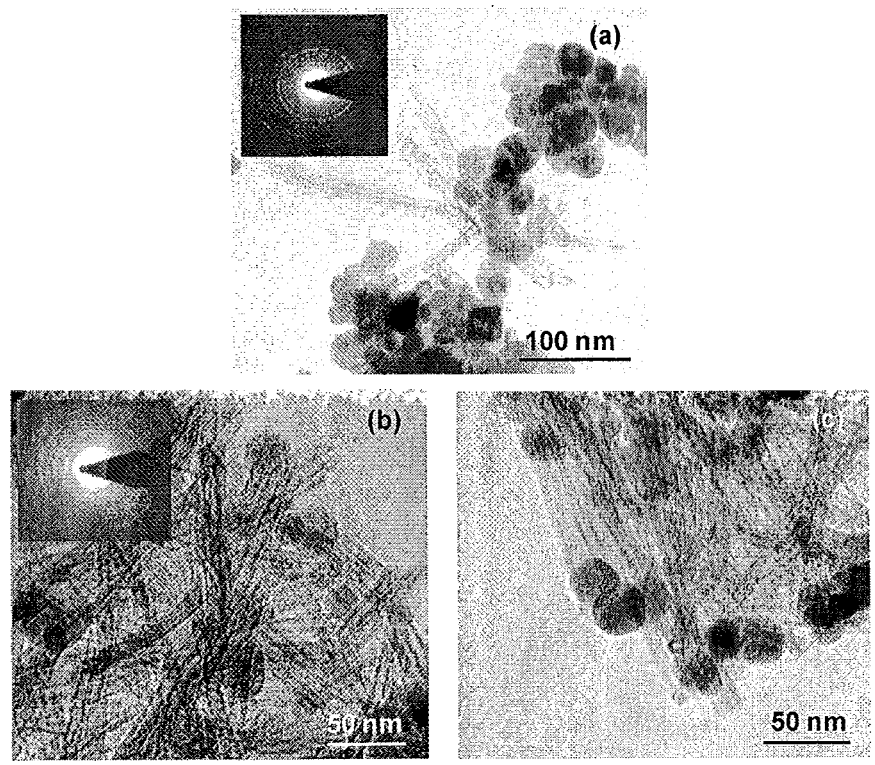

FIG. 21 represents (a-c) the TEM images of nano-nano integrated HTN-$\gamma$-$Fe_2O_3$ magnetic nanocomposite particles, with the corresponding SAED patterns shown as the insets in (a,b), processed via an ion-exchange mechanism operating under the dark-condition in an aqueous solution. In (a) and (b,c), the amount of $\gamma$-$Fe_2O_3$ in the magnetic nanocomposite is 50 wt. % and 10 wt. % respectively (balance being the weight of HTN).

Figure 22:
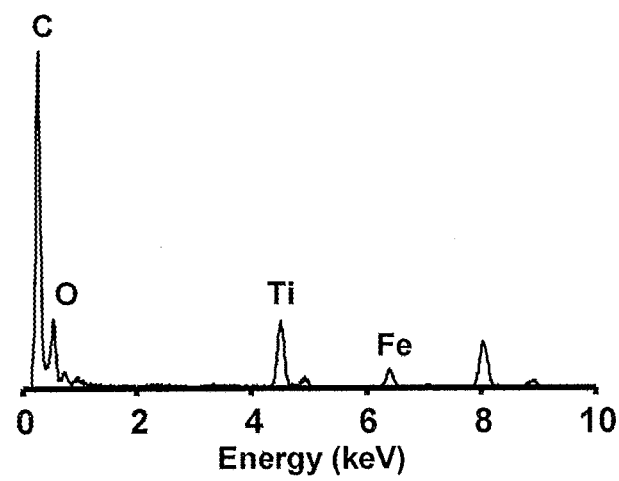

FIG. 22 represents the EDX pattern of HTN-$\gamma$-$Fe_2O_3$ magnetic nanocomposite particles processed via an ion-exchange mechanism operating under the dark-condition in an aqueous solution. The amount of $\gamma$-$Fe_2O_3$ in the magnetic nanocomposite is 10 wt. % (balance being the weight of HTN).

Figure 23:
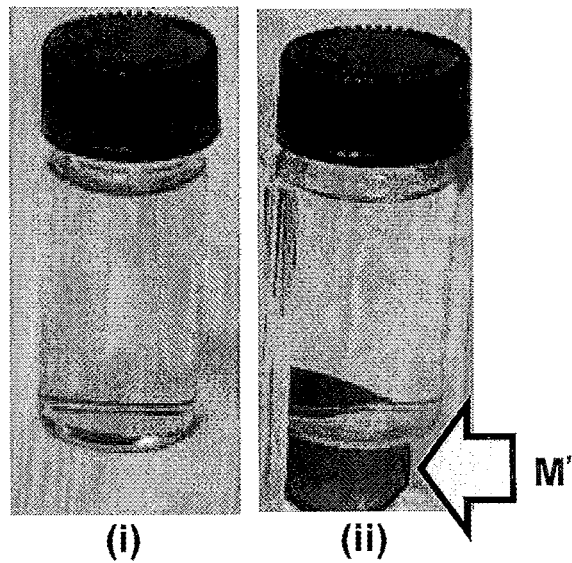

FIG. 23 represents the aqueous solution of MB dye (7.5 µM) (i) and the clear aqueous solution obtained after adsorbing the MB dye using the HTN-$\gamma$-$Fe_2O_3$ magnetic nanocomposite particles, which are settled at the bottom after the dye-adsorption process using a moderate external magnetic field (ii). The amount of $\gamma$-$Fe_2O_3$ in the magnetic nanocomposite is 10 wt. % (balance being the weight of HTN). M' represents an external magnet and arrow indicates its position.

Figure 24:
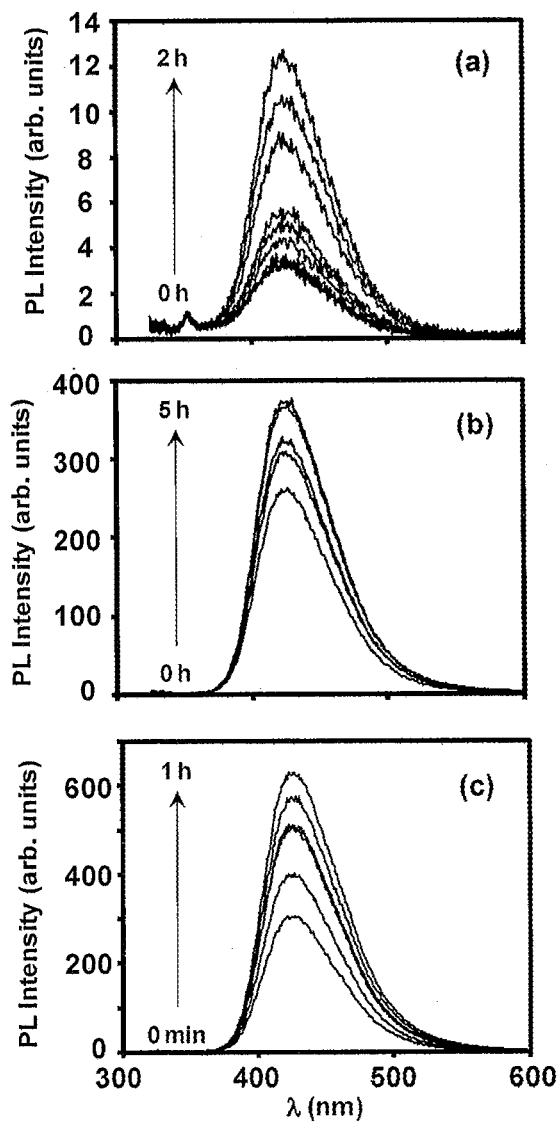

FIG. 24 represents the variation in the PL intensity associated with the formation of 2-hydroxyterepthalic acid as a function of UV-radiation exposure time as obtained for the magnetic $\gamma$-$Fe_2O_3$ nanoparticles (a), hydrothermally processed HTN (b), and commercially available nanocrystalline anatase-$TiO_2$ (Central Drug House (CDH) (P) Ltd., New Delhi, India) (c). The excitation wavelength is ~315 nm.

Figure 25:
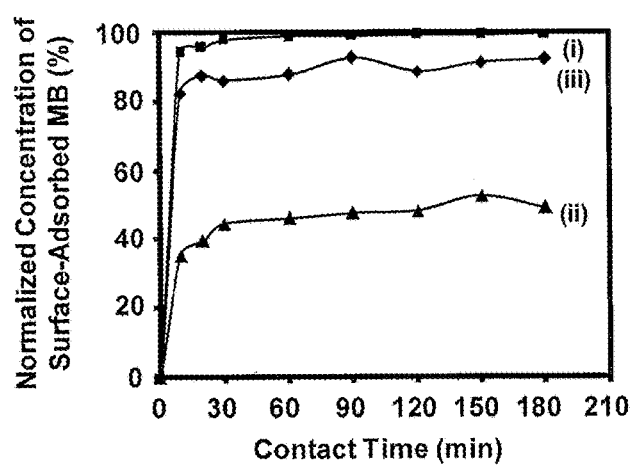

FIG. 25 represents the variation in the normalized concentration of surface-adsorbed MB dye as a function of contact time as obtained for the HTN-$\gamma$-$Fe_2O_3$ (5 wt. %) magnetic nano-composite particles under the different test-conditions. The initial MB dye concentration varies as 30 µM (i) and 100 µM (ii, iii). The graphs (ii) and (iii) are obtained without and with the surface-cleaning treatment of HTN-$\gamma$-$Fe_2O_3$ (5 wt. %) magnetic nano-composite particles following the 1.2 mg·$g^{-1}$ of MB dye adsorption on the surface as obtained in the graph (i).

Figure 26:
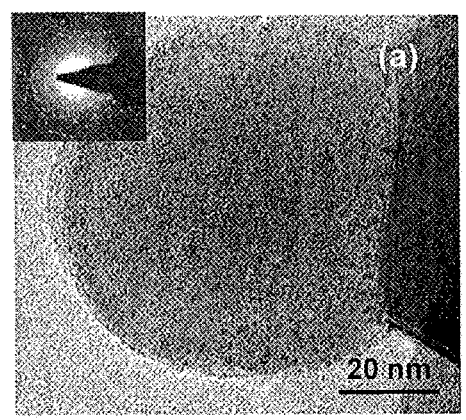
Figure 26:
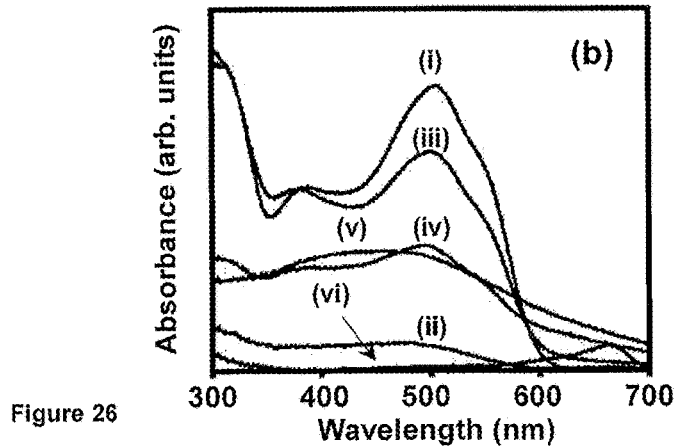

FIG. 26 represents (a) typical TEM image of the Pt-deposited nanocrystalline anatase-$TiO_2$ photocatalyst having the Pt/Ti mole-ratio of 5% and (b) the variation in the UV-visible absorption intensity obtained after the dye-adsorption experiments conducted using the industry effluent samples containing the Red M5B reactive dye, as observed for the HTN-$\gamma$-$Fe_2O_3$ (10 wt. %) magnetic nano-composite particles under the different test-conditions—(i) initial dye-solution, (ii) $1^{st}$ cycle of dye-adsorption, (iii) $2^{nd}$ cycle of dye-adsorption, (iv-vi) $2^{nd}$ cycle of dye-adsorption following the surface-cleaning treatment conducted using the Pt-deposited nanocrystalline anatase-$TiO_2$ having the Pt/Ti mole-ratio of 1, 5, and 10% respectively. In (a), the SAED pattern is shown as an inset.

Figure 27:
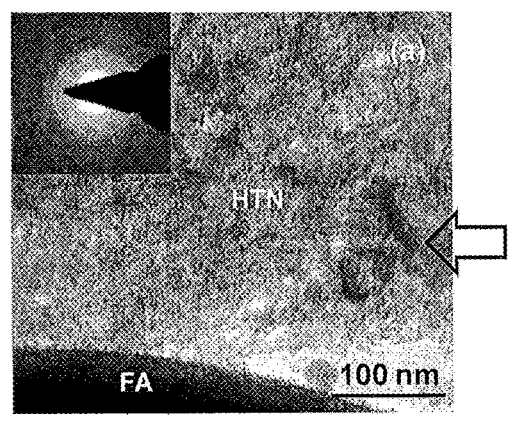
Figure 27:
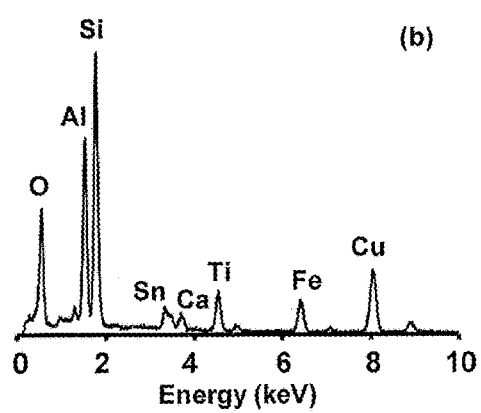

FIG. 27 represents the TEM image (a) and EDX spectrum (b) obtained using the $\gamma$-$Fe_2O_3$-HTN-flyash magnetic nanocomposite. In (a), the inset shows the corresponding SAED pattern. The HTN-$\gamma$-$Fe_2O_3$-flyash magnetic composite particles contains ~1 wt. % $\gamma$-$Fe_2O_3$ and ~8 wt. % HTN (balance being the weight of flyash particles).

Figure 28:
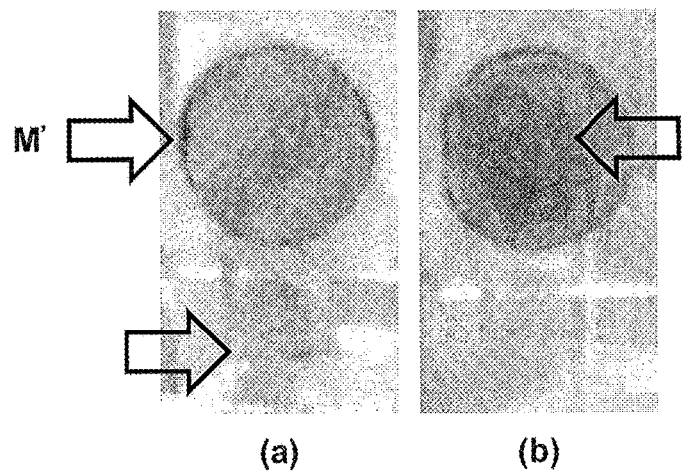

FIG. 28 represents the digital photographs comparing the ability of a vertically held magnet (M'), producing a moderate magnetic field, to hold the as-received flyash particles (a) and HTN-$\gamma$-$Fe_2O_3$-flyash magnetic nanocomposite particles (b). The arrows at the left-hand bottom-corner and right-hand upper-corner indicate the respective position of as-received flyash particles (a) and HTN-$\gamma$-$Fe_2O_3$-flyash magnetic nanocomposite particles (b). The HTN-$\gamma$-$Fe_2O_3$-flyash magnetic composite particles contains ~1 wt. % $\gamma$-$Fe_2O_3$ and ~8 wt. % HTN (balance being the weight of flyash particles).

FIG. 29 represents (a) the variation in the normalized concentration of surface-adsorbed MB dye as a function of contact time as obtained for the as-received flyash particles (i) and HTN-$\gamma$-$Fe_2O_3$-flyash magnetic composite particles (ii). The initial MB dye concentration and the initial solution-pH are 7.5 µM and 7.5. (b) represents the aqueous solution of MB dye (7.5 µM) (i) and the clear aqueous solution obtained after adsorbing the MB dye using the HTN-$\gamma$-$Fe_2O_3$-flyash magnetic composite particles, which are settled at the bottom after the dye-adsorption process using a moderate external magnetic field (ii). M' represents an external magnet and arrow indicates its position. The HTN-$\gamma$-$Fe_2O_3$-flyash magnetic composite particles contain ~1 wt. % $\gamma$-$Fe_2O_3$ and ~8 wt. % HTN (balance being the weight of $Sn^{2+}$-sensitized flyash particles);

FIG. 30 represents the TEM image (a) and EDX spectrum (b) obtained using the (10 wt. %) HTN-SnO composite particles.

Figure 31:
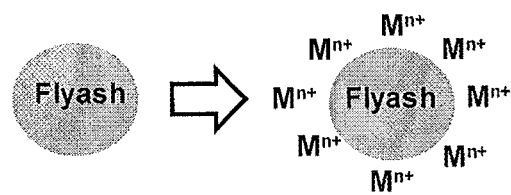

FIG. 31 represents schematically flyash particles being surface-sensitized by adsorbing metal-cations (Mn+) on their surfaces.

Figure 32:
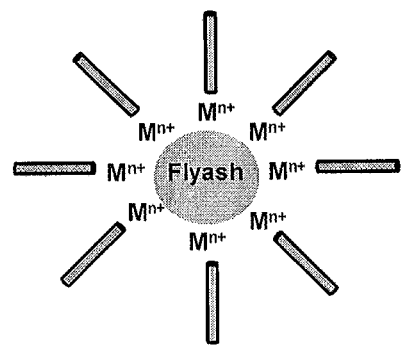

FIG. 32 represents schematically, the formation of composite particles undergoing an ionexchange mechanism, operating under the dark-condition in an aqueous solution, with the metal-cations (Mn+) which are pre-adsorbed on the surface of flyash particles.

Figure 33:
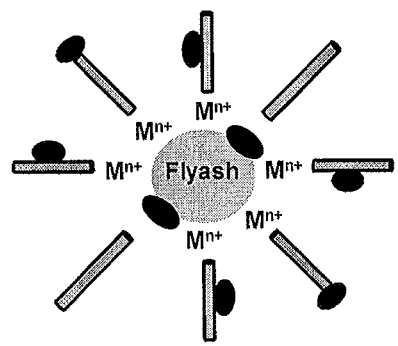

FIG. 33 represents schematically replacing of pure semiconductor-oxides nanotubes with those having surface-deposited magnetic nanoparticles or attached to the magnetic nanoparticles (shown as an oval-shape dark-color particle).

Figure 34:
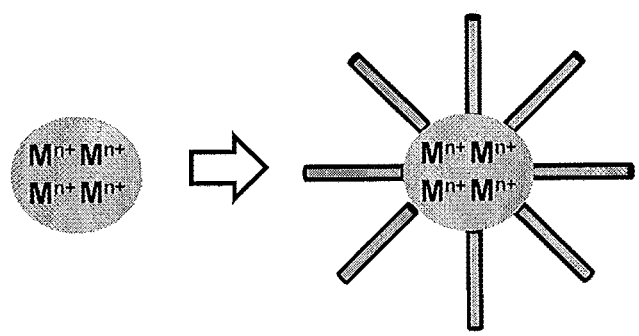

FIG. 34 represents schematically attaching or anchoring semiconductor-oxides nanotubes to the surface of magnetic g-Fe2O3 nanoparticles via an ion-exchange mechanism operating under the dark-condition in an aqueous solution.

DETAILED DESCRIPTION OF THE INVENTION

The present invention provides a method involving both, the surface-sensitization of flyash particles with the metal-cations ($M^{n+}$) or protons and an ion-exchange mechanism operating under the dark-condition in an aqueous solution, to process an innovative product consisting of the semiconductor-oxides nanotubes-flyash composite particles (magnetic or non-magnetic), and a method to recycle these composite particles in the dye-removal application thereof.

The present invention also provides a method, involving an ion-exchange mechanism operating under the dark-condition in an aqueous solution, to process a product consisting of the semiconductor-oxides nanotubes-metal oxide nano-composite particles (magnetic or non-magnetic), by eliminating the surface-sensitization step, wherein the metal-oxide is essentially the oxide of metal-cation ($M^{n+}$) which can surface-sensitize the flyash particles; and a method to recycle the magnetic/non-magnetic composite/nanocomposite particles in the dye-removal application thereof. In the present invention, the as-received flyash particles are first surface-sensitized by adsorbing the metal-cations ($M^{n+}$) on their surfaces, selected from the group consisting of $Sn^{2+}$/$Sn^{4+}$, $Fe^{2+}$/$Fe^{3+}$, $Pb^{2+}$, $Zn^{2+}$, $Cu^{2+}$, $Mn^{2+}$, $Ti^{4+}$, and others, by stirring the flyash particles in an acidic aqueous solution of metal-salt selected from the group consisting of chloride, nitrate, and sulfate-salts of metal-cations, as shown in FIG. 31.

The semiconductor-oxides nanotubes (HTN or ATN), which are processed separately via the conventional hydrothermal technique followed by the typical washing-cycles, are added to an acidic aqueous suspension of surface-sensitized flyash particles under the continuous overhead stirring. The nanotubes get deposited on the surface-sensitized flyash particles under the dark-condition in an aqueous solution, forming the nano-micro integrated semiconductor-oxides nanotubes-flyash composite particles (non-magnetic). The formation of composite particles has been attributed to the ability of semiconductor-oxides nanotubes to undergo an ion-exchange mechanism, operating under the dark-condition in an aqueous solution, with the metal-cations ($M^{n+}$) which are pre-adsorbed on the surface of flyash particles, as shown in FIG. 32.

The metal-cations ($M^{n+}$) may be replaced with the protons ($H^+$) to attach semiconductor-oxides nanotubes to the surface of sensitized flyash particles an ion-exchange mechanism operating under the dark-condition in an aqueous solution. The nanotubes are, hence, attached or anchored to the surface-sensitized flyash particles typically at the short-edges (tube-openings) due to higher energy of the nanotube-edge relative to that of nanotube-surface. It is obvious that replacing the pure semiconductor-oxides nanotubes with those having the surface-deposited (or surface-decorated) magnetic nanoparticles (metal or metal-oxide) or attached to the magnetic nanoparticles (metal or metal oxide, shown as an oval-shape dark-color particle), the semiconductor-oxides nanotubes-magnetic nanoparticles-flyash composite having the magnetic property can be produced, as shown in FIG. 33.

The semiconductor-oxides nanotubes-flyash composite particles (magnetic or non-magnetic) (and also the as-received flyash particles) are suitable for the removal of an organic synthetic-dye from an aqueous solution via the surface-adsorption process, involving the ion-exchange and electrostatic-attraction mechanisms operating in the dark-condition, and can be separated from the treated aqueous solution via the centrifuging, gravity-settling, or magnetic separation. It is obvious that the dye-adsorption capacity of semiconductor-oxides nanotubes-flyash composite particles can be increased by using the nanotubes which are doped with the noble-metal(s) or surface-deposited with the noble-metal nanoparticles, selected from the group consisting of Au, Ag, Pt, Pd, and other noble-metals. The previously adsorbed-dye can be decomposed on the surface of semiconductor-oxides nanotubes-flyash composite particles (non-magnetic) (or the as-received flyash particles), via an innovative method, by mixing them with the conventional magnetic photocatalyst, such as the nanocrystalline anatase-$TiO_2$-coated $SiO_2$/$\gamma$-$Fe_2O_3$ in an aqueous solution and then subjecting the resulting aqueous suspension to the UV or solar-radiation exposure under the continuous overhead stirring. The photocatalytic activity of semiconductor-oxides nanotubes and as-received flyash particles under the UV or solar-radiation is relatively low. However, relatively large concentration of free-OH. are generated by the nanocrystalline magnetic photocatalyst particles under the similar test-conditions, which attack and degrade an organic synthetic-dye previously adsorbed on the surface of semiconductor-oxides nanotubes-flyash composite particles (non-magnetic) (or the as-received flyash particles). After the decomposition of previously adsorbed-dye on the surface (that is, the surface-cleaning treatment), the semiconductor-oxides nanotubes-flyash composite particles (non-magnetic) (or the as-received flyash particles) and the magnetic photocatalyst can be separated from their mechanical mixture using a moderate external magnetic field. The surface-cleaned semiconductor-oxides nanotubes-flyash composite particles (non-magnetic) (or the as-received flyash particles) can be recycled for the next-cycle of dye-adsorption conducted in the dark-condition. It is obvious that for the recycling of non-magnetic semiconductor-oxides nanotubes-flyash composite particles (or the as-received flyash particles), in the dye-removal application, the nanocrystalline photocatalyst particles must be magnetic for their effective magnetic separation after the dye-decomposition under an exposure to the UV or solar-radiation. It is also obvious that for the recycling of magnetic semiconductor-oxides nanotubes-flyash composite particles, the nanocrystalline photocatalyst particles must be non-magnetic such as the nanocrystalline anatase-$TiO_2$. Moreover, the magnetic photocatalyst, used for the recycling of semiconductor-oxides nanotubes-flyash composite particles (or the as-received flyash particles), may contain the magnetic component selected from the group of $\gamma$-$Fe_2O_3$, $CoFe_2O_4$, $NiFe_2O_4$, $MnFe_2O_4$, Co, Fe, Ni, and other magnetic materials, and the photocatalyst component selected from the group of nanocrystalline semiconductor materials consisting of $TiO_2$, ZnO, CdS, ZnS, and others, in the undoped or doped form, without or with the surface-modifications including the deposition of noble-metal or foreign metal-oxide nanoparticles. It is also obvious that if the photocatalyst component of the magnetic photocatalyst is doped with the non-metals such as C, N, S, and others, an exposure to the fluorescent or visible-radiation may also be used to generate the large concentration of free-OH. for decomposing the previously adsorbed-dye on the surface of semiconductor-oxides nanotubes-flyash composite particles. To produce the semiconductor-oxides nanotubes-metal oxide nanocomposite particles (magnetic or non-magnetic), it is obvious that the flyash particles must be replaced with the metal-oxide nanoparticles. However, if the metal-oxide is the oxide of metal-cation ($M^{n+}$), which can surface-sensitize the flyash particles, wherein the metal-oxide is selected from the group consisting of $\gamma$-$Fe_2O_3$, $SnO/SnO_2$, PbO, ZnO, CuO, MnO, $TiO_2$, and others, then the surface-sensitization is not an essential step and can be eliminated. Typically, to produce a magnetic nanocomposite via an ion-exchange mechanism operating under the dark-condition in an aqueous solution, the as-received flyash particles are replaced with the nanocrystalline magnetic metal-oxide particles such as $\gamma$-$Fe_2O_3$ (maghemite). Since $\gamma$-$Fe_2O_3$ contains $Fe^{2+}$/$Fe^{3+}$ cations which can surface-sensitize the as-received flyash particles, the surface-sensitization step can be eliminated for attaching or anchoring the semiconductor-oxides nanotubes to the surface of magnetic $\gamma$-$Fe_2O_3$ nanoparticles via an ion-exchange mechanism operating under the dark-condition in an aqueous solution, as shown in FIG. 34. The semiconductor-oxides nanotubes are attached or anchored to the surface of metal-oxide, such as $\gamma$-$Fe_2O_3$, nanoparticles typically at the short-edges (tube-openings) due to higher energy of the nanotube-edge relative to that of nanotube-surface. The nano-nano integrated semiconductor-oxide nanotubes-metal oxide nanocomposite particles, thus produced, are also suitable for the removal of an organic synthetic-dye from an aqueous solution via the surface-adsorption process, involving the ion-exchange and electrostatic-attraction mechanisms, operating in the dark-condition. Typically, the semiconductor-oxides nanotubes-$\gamma$-$Fe_2O_3$ magnetic nanocomposite particles find application for the removal of an organic synthetic-dye from an aqueous solution via the surface-adsorption process, involving the ion-exchange and electrostatic-attraction mechanisms operating in the dark-condition, and can be separated from the treated aqueous solution using an external magnetic field. The previously adsorbed-dye can be decomposed on the surface of semiconductor-oxides nanotubes-$\gamma$-$Fe_2O_3$ magnetic nanocomposite particles by mixing them with the non-magnetic nanocrystalline particles of anatase-$TiO_2$ photocatalyst in an aqueous solution and then subjecting the resulting suspension to the UV or solar-radiation under the continuous overhead stirring. It is to be noted that the pure nanocrystalline anatase-$TiO_2$ used for the surface-cleaning treatment may get attached to (or anchored to) the HTN-$\gamma$-$Fe_2O_3$ magnetic nanocomposite particles via an ion-exchange mechanism operating the under the dark-condition in an aqueous solution. This makes the magnetic separation of photocatalyst particles from the magnetic nanocomposite particles difficult after the surface-cleaning treatment. To avoid this situation, the pure nanocrystalline anatase-$TiO_2$ is not utilized as a photocatalyst but surface-modified to avoid the operation of ion-exchange mechanism while maintaining (or even increasing) the high concentration of free-OH. produced under the UV or solar-radiation exposure. The noble-metal-deposited (selected from the group of Pt, Au, Pd, Ag, and others) nanocrystalline anatase-$TiO_2$ effectively serves both the purposes. The photocatalytic activity of semiconductor-oxides nanotubes and $\gamma$-$Fe_2O_3$ magnetic nanoparticles under the UV or solar-radiation is relatively low. The photocatalytic activity of semiconductor-oxides nanotubes, under the UV or solar-radiation, is further decreased if the previously adsorbed-dye exists on their surfaces. However, relatively large concentration of free-OH. are generated by the non-magnetic noble-metal deposited nanocrystalline anatase-$TiO_2$ photocatalyst particles under the UV or solar-radiation, which attack and degrade the organic synthetic-dye previously adsorbed on the surface of semiconductor-oxides nanotubes-$\gamma$-$Fe_2O_3$ magnetic nanocomposite particles. After the decomposition of previously adsorbed-dye on the surface (that is, the surface-cleaning treatment), the semiconductor-oxides nanotubes-$\gamma$-$Fe_2O_3$ magnetic nanocomposite particles and the non-magnetic noble-metal deposited nanocrystalline anatase-$TiO_2$ photocatalyst particles can be separated from their mechanical mixture using a moderate external magnetic field. The surface-cleaned semiconductor-oxides nanotubes-$\gamma$-$Fe_2O_3$ magnetic nanocomposite particles can be recycled for the next-cycle of dye-adsorption conducted in the dark-condition. It is obvious that for the magnetic nanocomposite particles, the nanocrystalline photocatalyst particles must be non-magnetic, which may be selected from the group consisting of the nanocrystalline (~3-30 nm) semiconductor materials such as $TiO_2$, ZnO, CdS, ZnS, and others. It is also obvious that for the recycling of semiconductor-oxides nanotubes-metal oxide nanocomposite particles (non-magnetic), the nanocrystalline photocatalyst particles must be magnetic, that is magnetic photocatalyst, which may contain the magnetic component selected from the group of $\gamma$-$Fe_2O_3$, $CoFe_2O_4$, $NiFe_2O_4$, $MnFe_2O_4$, Co, Fe, Ni and other magnetic materials, and the photocatalyst component selected from the group of nanocrystalline (~3-30 nm) semiconductor materials consisting of $TiO_2$, ZnO, CdS, ZnS, and others, in the undoped or doped form, without or with the surface-modifications including the deposition of noble-metal or foreign metal-oxide nanoparticles. It is also obvious that if the photocatalyst particles (magnetic or non-magnetic) are doped with the non-metals such as C, N, S, and others, an exposure to the fluorescent or visible-radiation may be used to generate the large concentration of free-OH. for decomposing the previously adsorbed-dye on the surface of semiconductor-oxides nanotubes-metal oxide nanocomposite particles. It is obvious that the previously adsorbed-dye on the surface of semiconductor-oxides nanotubes-flyash composite particles (magnetic or non-magnetic) and the semiconductor-oxides nanotubes-metal oxide nanocomposite particles (magnetic or non-magnetic) can be decomposed via the Fenton-like reactions by stirring them in the $H_2O_2$ solution (3-100 wt. %) typically in the dark-condition. Under this situation, the use of both the photocatalyst particles and an exposure to the UV, solar, fluorescent, or visible-radiation is not essential for the surface-cleaning treatment; that is, the latter can be conducted in the dark-condition. It is also obvious that the different composite products of this invention can also be used to form a static-bed for the dye-removal application, wherein the static-bed is formed using a mechanical mixture of non-magnetic flyash-based composite particles and the magnetic photocatalyst particles or using a mechanical mixture of magnetic nanocomposite particles and the non-magnetic photocatalyst particles. After the dye-adsorption obtained through the passage of aqueous dye-solution thorough the bed-column, the static-bed having the surface-adsorbed dye may be exposed to the UV, solar, fluorescent, or visible-radiation while simultaneously passing an aqueous solution through the bed-column to decompose the previously adsorbed-dye on the surface. The previously adsorbed-dye on the surface of static-bed may also be decomposed, typically in the dark-condition, by passing the $H_2O_2$ solution (3-100 wt. %) through the bed-column. If the static-bed is formed using only the flyash-based composite products with the absence of photocatalyst particles, then the previously adsorbed-dye on the surface of static-bed may be decomposed, typically in the dark-condition, by passing the $H_2O_2$ solution (3-100 wt. %) through the bed-column.

The present invention provides an innovative method, which involves the surface-sensitization step, for the processing of an innovative product consisting of the nano-micro integrated semiconductor-oxides nanotubes-flyash composite particles (magnetic or non-magnetic), via an ion-exchange mechanism operating under the dark-condition in an aqueous solution, and the industrial dye-removal application involving their recycling via an innovative method thereof; 50-250 ml acidic aqueous solution having the initial solution-pH in the range of ~1-2, adjusted using the 1 M HCl solution, is first prepared; 5-60 g·l$^{-1}$ of metal-salt is dissolved in the acidic aqueous solution, wherein the metal-salt is selected from the group consisting of chloride, nitrate, and sulfate-salts of $Sn^{2+}$/$Sn^{4+}$, $Fe^{2+}$/$Fe^{3+}$, $Pb^{2+}$, $Zn^{2+}$, $Cu^{2+}$, $Mn^{2+}$, $Ti^{4+}$, and other metal-cations (in general, $M^{n+}$); the dissolution time of metal-salt in the acidic aqueous solution is varied in the range of 30 min-5 h under the continuous overhead stirring; 1-10 g of as-received flyash particles having the spherical morphology and diameter in the range of 0.5-100 μm are then suspended in the acidic aqueous solution of metal-salt; the resulting suspension is stirred continuously using an overhead stirrer for 30 min-5 h for adsorbing the metal-cations ($M^{n+}$) on the surface of as-received flyash particles (surface-sensitization); the semiconductor-oxides nanotubes such as HTN or ATN are processed separately via the conventional hydrothermal method in combination with either conventional sol-gel or acetic acid ($CH_3COOH$) modified sol-gel method; 0.05-3 g of HTN or ATN are then added to the above suspension of surface-sensitized flyash particles under the continuous overhead stirring; the suspension is then sonicated for 5-30 min and then stirred continuously using an overhead stirrer for 30 min-5 h for the adsorption of semiconductor-oxides nanotubes on the surface-sensitized flyash particles via an ion-exchange mechanism operating under the dark-condition in an aqueous solution; the nano-micro integrated semiconductor-oxides nanotubes-flyash composite particles (non-magnetic), thus formed, are separated using a centrifuge operated at 2000-4000 rpm, washed multiple-times using 50-250 ml distilled-water till the solution-pH of filtrate remains unchanged or constant, separated using a centrifuge operated at 2000-4000 rpm, and then dried in an oven at 70-90° C. for 10-15 h. The various parameters such as the dissolution time and initial concentration of metal-salt, the contact time of aqueous solution of metal-salt with the as-received flyash particles and that of the semiconductor-oxides nanotubes with the surface-sensitized flyash particles are optimized for the as-received flyash particles surface-sensitized with the $Sn^{2+}$ cations. The as-received flyash particles or the nano-micro integrated semiconductor-oxides nanotubes-flyash composite particles (non-magnetic) are suitable for the removal of an organic synthetic-dye from an aqueous solution via the surface-adsorption process involving the ion-exchange and electrostatic-attraction mechanisms operating in the dark-condition. The dye-adsorption measurements are conducted in the dark-condition using the methylene blue (MB) as a model catalytic dye-agent. The effect of Ag-doping (Ag/Ti ratio is varied as 0, 1, and 5%) on the dye-adsorption capacity of pure-ATN and ATN-flyash composite particles is shown within the initial MB dye concentration range of 5-100 μM at the initial solution-pH within the range of ~2.5-11. In order to decompose the previously adsorbed-dye on the surface of as-received flyash particles or the semiconductor-oxides nanotubes-flyash composite particles (non-magnetic) and to recycle them as catalyst for the next-cycles of dye-adsorption conducted in the dark-condition, 0.1-5 g of as-received flyash particles or the semiconductor-oxides nanotubes-flyash composite particles (non-magnetic) having the surface-adsorbed MB dye (0.1-10 mg·g$^{-1}$) are suspended in 50-250 ml aqueous solution under the continuous overhead stirring; 0.1-5 g of conventional magnetic photocatalyst (typically, the nanocrystalline (~3-30 nm) anatase-$TiO_2$-coated $SiO_2$/$\gamma$-$Fe_2O_3$ magnetic particles (processed separately via the combination of modified-Stober and conventional sol-gel methods) are then suspended under the continuous overhead stirring; the resulting suspension is sonicated for 5-30 min and then stirred continuously using an overhead stirrer under the UV or solar-radiation exposure for 1-10 h; the mixture of as-received flyash particles or the semiconductor-oxides nanotubes-flyash composite particles (non-magnetic) and the magnetic photocatalyst particles are separated using a centrifuge operated at 2000-4000 rpm, washed multiple-times using 50-250 ml distilled-water till the solution-pH of the filtrate remained unchanged or neutral; the non-magnetic as-received flyash particles or the semiconductor-oxides nanotubes-flyash composite particles and the magnetic photocatalyst particles are separated using a moderate external magnetic field and then dried in an oven at 70-90° C. for 10-15 h; the dried as-received flyash particles or the semiconductor-oxides nanotubes-flyash composite particles (non-magnetic) are recycled for the next-cycles of dye-adsorption conducted in the dark-condition; the nano-micro integrated HTN-flyash composite particles are also processed by replacing the $Sn^{2+}$ cations with the $Fe^{3+}$ cations as the surface-sensitizer and iron(III) nitrate ($Fe(NO_3)_3.6H_2O$) as a metal-salt instead of $SnCl_2$; the amount of MB dye-adsorbed by the nano-micro integrated HTN-flyash composite particles, processed using the $Fe^{3+}$ cations as the surface-sensitizer, is compared with that adsorbed using the as-received flyash particles at the initial MB concentration within the range of 7.5-100 μM and the initial solution-pH of 2.5-11; the nano-micro integrated HTN-flyash composite particles are also processed by replacing the $Sn^{2+}$ cations with the $H^+$ ions as the surface-sensitizer (that is, without the addition of a metal-salt, and hence, eliminating the dissolution time); the amount of MB adsorbed by the nano-micro integrated HTN-flyash composite particles, processed using the $H^+$ ions as the surface-sensitizer, is compared with that adsorbed by the as-received flyash particles at the initial MB concentration within the range of 7.5-100 μM and the initial solution-pH of 2.5-11.

The present invention also provides an innovative method without involving the surface-sensitization step for the processing of an innovative product, consisting of the nano-nano integrated semiconductor-oxides nanotubes-metal oxide nanocomposite particles (magnetic or non-magnetic), via an ion-exchange mechanism operating under the dark-condition in an aqueous solution, and the industrial dye-removal application involving their recycling via an innovative method thereof; the metal-oxide nanoparticles are selected from the group of metal-oxides, such as $\gamma$-$Fe_2O_3$ (magnetic), $SnO/SnO_2$, $PbO$, $ZnO$, $CuO$, $MnO$, $TiO_2$, and others, wherein the metal-oxide is essentially the oxide of metal-cation ($M^{n+}$) which can surface-sensitize the surface of flyash particles; the semiconductor-oxides nanotubes-$\gamma$-$Fe_2O_3$ magnetic nanocomposite particles are processed via an ion-exchange mechanism operating under the dark-condition in an aqueous solution without the involvement of surface-sensitization step since $Fe^{2+}/Fe^{3+}$ ions within the $\gamma$-$Fe_2O_3$ magnetic nanoparticles can surface-sensitize the as-received flyash particles; 50-250 ml aqueous suspension is first prepared by suspending 0.1-0.9 g of $\gamma$-$Fe_2O_3$ magnetic nanoparticles are dispersed in an aqueous solution having the neutral solution-pH (~6.5-7.5) under the continuous overhead stirring; 0.1-0.9 g of HTN is added to this suspension under the continuous overhead stirring; the resulting suspension containing total 1 g of solid particles added is sonicated for 5-30 min and then stirred in the dark-condition for 1-10 h using an overhead stirrer; the HTN-$\gamma$-$Fe_2O_3$ magnetic nanocomposite particles, thus formed via an ion-exchange mechanism operating under the dark-condition in an aqueous solution, are separated using the moderate external magnetic field and washed multiple-times using the distilled-water till the solution-pH of filtrate remains unchanged or neutral; the magnetic nanocomposite particles are separated again using the moderate external magnetic field and dried in an oven at 70-90° C. for 10-15 h.

0.1-5.0 g of semiconductor oxide nanotubes-$\gamma$-$Fe_2O_3$ magnetic nanocomposite particles, containing 5-90 wt. % of HTN, are then used for the removal of MB dye (7.5-250 μM) from an aqueous solution (50-250 ml) via the surface-adsorption process, involving the ion-exchange and electro-static-attraction mechanisms operating in the dark-condition.

To decompose the previously adsorbed-dye on the surface and to recycle them for the next-cycles of dye-adsorption conducted in the dark-condition, 0.1-5.0 g of magnetic HTN-$\gamma$-$Fe_2O_3$ nanocomposite particles, containing 1-5 mg·$g^{-1}$ of MB dye adsorbed on the surface, are suspended in 50-250 ml aqueous solution under the continuous overhead stirring; the non-magnetic Pt-deposited (Pt/Ti mole ratio within the range of 1-15%) nanocrystalline (~10-30 nm) anatase-$TiO_2$ photocatalyst particles are then added to the above suspension under the continuous overhead stirring; the resulting suspension is sonicated for 5-30 min, then exposed to the UV or solar-radiation for 30 min-5 h under the continuous overhead stirring; the mixture of surface-cleaned magnetic nanocomposite particles and the non-magnetic Pt-deposited nanocrystalline anatase-$TiO_2$ photocatalyst particles are separated using a centrifuge operated at 2000-4000 rpm and washed multiple-times using 50-250 ml distilled-water till the solution-pH of filtrate remains unchanged; the surface-cleaned magnetic nanocomposite particles are separated from the non-magnetic Pt-deposited nanocrystalline anatase-$TiO_2$ photocatalyst using an external magnetic field; the separated powders are dried in an oven at 70-90° C. for 10-15 h; the surface-cleaned magnetic nanocomposite particles are recycled for the next-cycle of dye-adsorption conducted in the dark-condition and its dye-adsorption behavior is compared with that of magnetic nanocomposite particles having the surface-adsorbed MB dye which is not subjected to the surface-cleaning treatment.

The present invention also provides an innovative method for the processing of an innovative product consisting of flyash-based magnetic composite particles; the HTN-$\gamma$-$Fe_2O_3$ magnetic nanocomposite (5-90% HTN) is first processed, without involving the surface-sensitization step, via the ion-exchange mechanism operating under the dark-condition in an aqueous solution; the HTN-$\gamma$-$Fe_2O_3$ magnetic nanocomposite is then attached or anchored to the flyash particles, surface-sensitized with $Sn^{2+}$ cations, via the ion-exchange mechanism operating under the dark-condition in an aqueous solution.

The non-obvious inventive step(s) of the present invention with respect to the prior art are as follows.
(1) The addition of hydrothermally processed semiconductor-oxide nanotubes, such as the HTN or ATN, in the aqueous suspension of flyash particles having the pre-adsorbed surface metal-cations.
(2) The formation of micro-nano integrated semiconductor-oxide nanotubes-flyash composite particles via an ion-exchange mechanism operating under the dark-condition in an aqueous solution.
(3) The use of micro-nano integrated semiconductor-oxide nanotubes-flyash composite particles (or the as-received flyash particles) in the dye-removal application via the surface-adsorption process involving the ion-exchange and electrostatic-attraction mechanisms operating in the dark-condition, wherein the composite particles (or the as-received flyash particles) are recycled by decomposing the previously adsorbed-dye on the surface via an innovative process involving the use of combination of a magnetic photocatalyst and an exposure to the UV or solar-radiation.
(4) The addition of hydrothermally processed semiconductor-oxide nanotubes, such as the HTN or ATN, in an aqueous suspension of metal-oxide particles at the neutral solution-pH, wherein the metal-oxide nanoparticles contain the metal-cations ($M^{n+}$) which can surface-sensitize the flyash particles. This results in the formation of semiconductor-oxide nanotubes-metal oxide nano-composite (magnetic or non-magnetic) particles without involving the surface-sensitization step.
(5) The formation of nano-nano integrated semiconductor-oxide nanotubes-metal oxide nanocomposite particles (magnetic or non-magnetic) via an ion-exchange mechanism operating under the dark-condition in an aqueous solution without involving the surface-sensitization step.
(6) The use of nano-nano integrated semiconductor-oxide nanotubes-metal oxide nanocomposite particles (magnetic) in the dye-removal application via the surface-adsorption process involving the ion-exchange and electrostatic attraction mechanisms operating in the dark-condition, wherein the magnetic nanocomposite particles are recycled by decomposing the previously adsorbed-dye on the surface via an innovative process involving the use of combination of non-magnetic noble-metal-deposited (including Pt, Au, Pd, Ag, and others) photocatalyst, such as nanocrystalline anatase-$TiO_2$, and exposure to the UV or solar-radiation.
(7) The adsorption of semiconductor-oxide nanotubes, which are attached to (or anchored to) the magnetic metal-oxide nanoparticles, on the surface-sensitized flyash particles via an ion-exchange mechanism operating under the dark-condition in an aqueous solution resulting in the formation of flyash-based magnetic composite particles.

The novelty of the present invention with respect to the prior art is as follows.
(1) The formation of micro-nano integrated semiconductor-oxide nanotubes-flyash composite particles via an ion-exchange mechanism operating under the dark-condition in an aqueous solution.
(2) The formation of nano-nano integrated semiconductor-oxide nanotubes-metal oxide nanocomposite particles via an ion-exchange mechanism operating under the dark-condition in an aqueous solution by eliminating the surface-sensitization step.
(3) The recycling of semiconductor-oxide nanotubes-flyash composite particles (non-magnetic) in the dye-removal application involving the use of a magnetically separable and photocatalytically active magnetic photocatalyst.
(4) The recycling of semiconductor-oxide nanotubes-metal oxide nanocomposite particles (magnetic) in the dye-removal application involving the use of non-magnetic and photocatalytically active noble-metal-deposited nanocrystalline anatase-$TiO_2$ particles.
(5) The formation of micro-nano integrated semiconductor-oxide nanotubes-metal oxide-flyash composite particles (magnetic) via an ion-exchange mechanism operating under the dark-condition in an aqueous solution.
(6) The use of micro-nano integrated semiconductor-oxide nanotubes-metal oxide-flyash composite particles (magnetic) in the application related to the dye-removal via the surface-adsorption process involving the ion-exchange and electrostatic attraction mechanisms; and their recycling involving the use of non-magnetic and photocatalytically active noble-metal-deposited nanocrystalline anatase-$TiO_2$ particles.

EXAMPLES

The following examples are given by way of illustration therefore should not be construed to limit the scope of the invention.

Example-1

In this example, HTN are processed via the conventional hydrothermal method. 3 g of as-received nanocrystalline anatase-$TiO_2$ (Central Drug House (CDH) (P) Ltd., New Delhi, India) is suspended in a highly alkaline aqueous solution, containing 10 M NaOH (Assay 97%, S.D. Fine-Chem Ltd., Mumbai, India), filled up to 84 vol. % of a Teflon-beaker placed in a stainless-steel (SS 316) vessel of 200 ml capacity. The process is carried out with continuous stirring in an autoclave (Amar Equipment Pvt. Ltd., Mumbai, India) at 120° C. for 30 h under an autogenous pressure. The autoclave is allowed to cool naturally to room temperature and the hydrothermal product is separated by decanting the top solution. The initial product is subjected to typical washing-cycles with the first-cycle of washing conducted using 100 ml of 1 M HCl solution (35 wt. %, Qualigens Fine Chemicals, India) at 25° C. for 1 h followed by that using 100 ml of distilled-water for 1 h. The product obtained is then subjected to the second washing-cycle consisting of washing using 100 ml of 1 M HCl at 25° C. for 1 h and then multiple times (#8) using 100 ml of distilled-water at 25° C. for 1 h till the pH (Hanna Hi. 2210 Bench Top, Sigma-Aldrich, India) of the filtrate became almost constant or neutral. The washed-product is then separated from the solution using a centrifuge (Hettich EBA 20, Sigma-Aldrich, India) and dried in an oven at 80° C. for 12 h to obtain the hydrothermally processed HTN.

Figure 1:
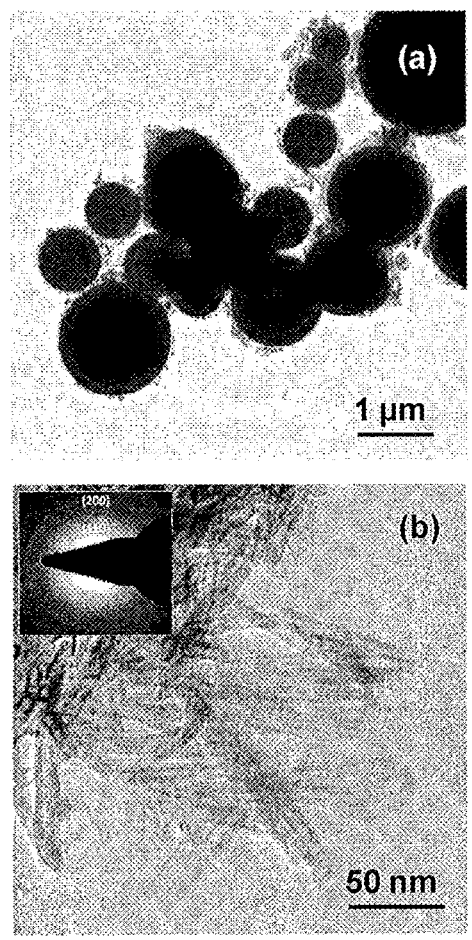
FIG. 1 represents the TEM images of as-received flyash particles (a) and hydrothermally processed HTN (b).
Figure 2:
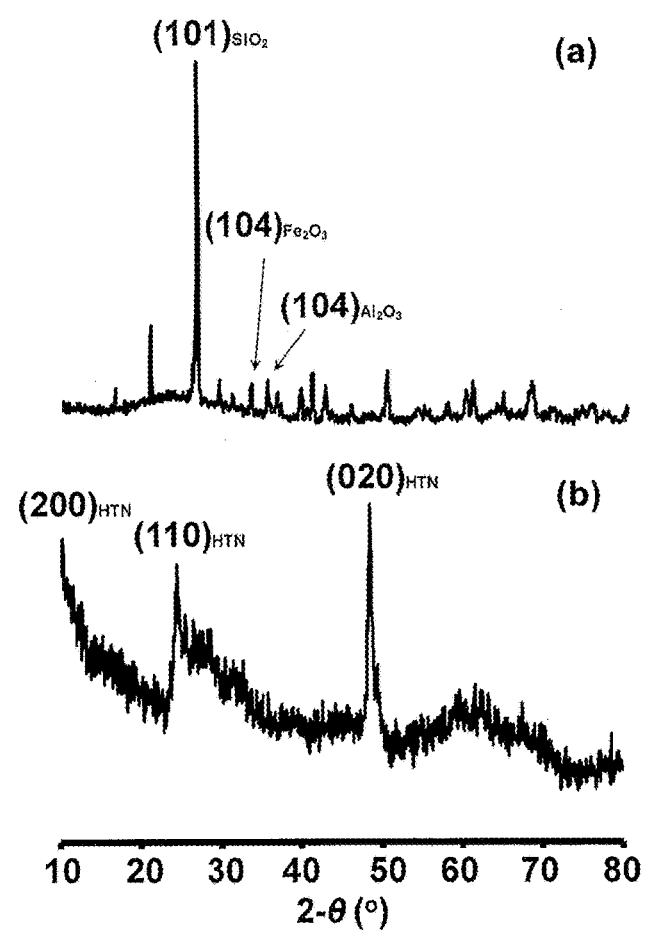
FIG. 2 represents the XRD patterns of as-received flyash particles (a) and hydrothermally processed HTN (b).
Figure 3:
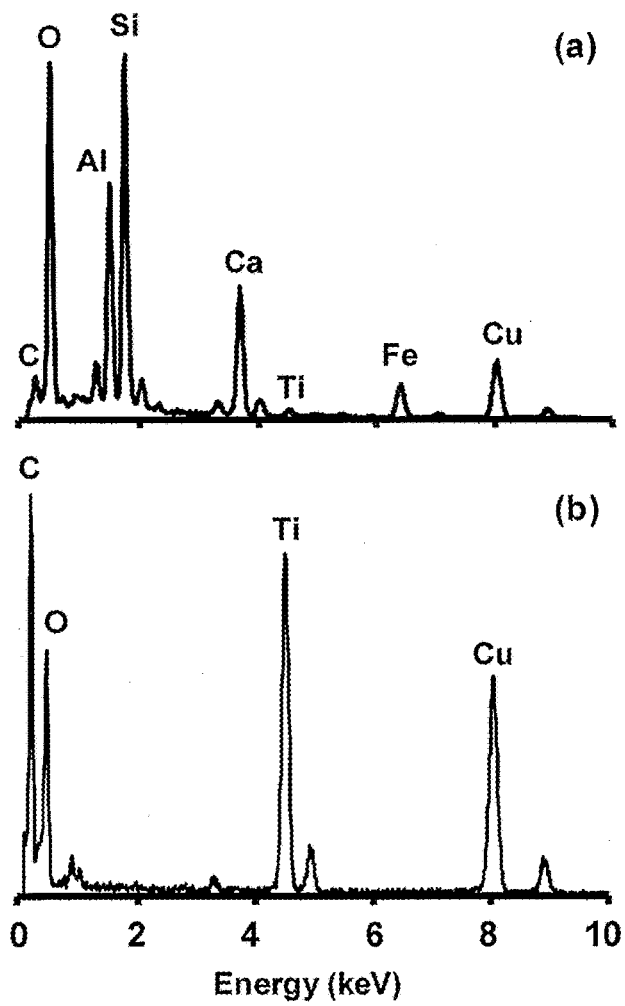
FIG. 3 represents the EDX spectra of as-received flyash particles (a) and hydrothermally processed HTN (b).

The TEM images of as-received flyash particles (National Thermal Power Corporation (NTPC), Ramagundam, India) and the hydrothermally processed HTN are presented in FIGS. 1(a) and 1(b). The as-received flyash particles are spherical with the size in the range of 0.5-2 μM. The average length, internal and outer diameters, and wall-thickness of HTN are 75, 2.3, 4.2, and 0.96 nm respectively. The powder XRD patterns of as-received flyash and HTN are presented in FIGS. 2(a) and 2(b). In FIG. 2(a), the major-peaks of $SiO_2$, $Al_2O_3$, and $Fe_2O_3$ have been identified after comparison with the JCPDS card nos. 83-2465, 78-2426, and 84-0311 respectively. In FIG. 2(b), the XRD pattern has been identified to be similar to that of $H_2Ti_3O_7$ or the lepidocrocite-type hydrogen titanate ($H_xTi_{2-x/4\gamma x/4}O_4 \cdot H_2O$, where x≈0.7, γ: vacancy). The EDX analyses of as-received flyash and HTN are presented in FIGS. 3(a) and 3(b). In FIG. 3(a), Si, Al, Ca, Fe are observed with the trace amount of Ti (Cu is originating from the Cu-grid used for the TEM analysis). This suggests that the as-received flyash particles are composed of mixture of $SiO_2$, $Al_2O_3$, $Fe_2O_3$, CaO, with the trace amount of $TiO_2$. On the other hand, in FIG. 3(b), only Ti and O are seen as the major elements within the HTN.

Figure 4:
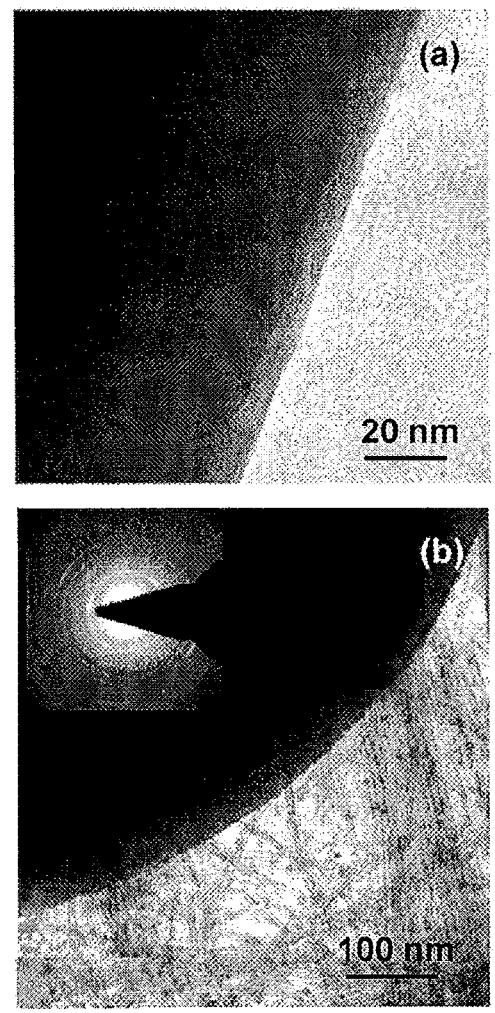
FIG. 4 represents the high magnification TEM images of as-received flyash particle (a) and the micro-nano integrated HTN-flyash composite particle (b) showing the surface and interphase regions. In (b), the composite particle is processed via an ion-exchange mechanism operating under the dark-condition in an aqueous solution using the $Sn^{2+}$ cations for the surface-sensitization of as-received flyash particles.
Figure 5:
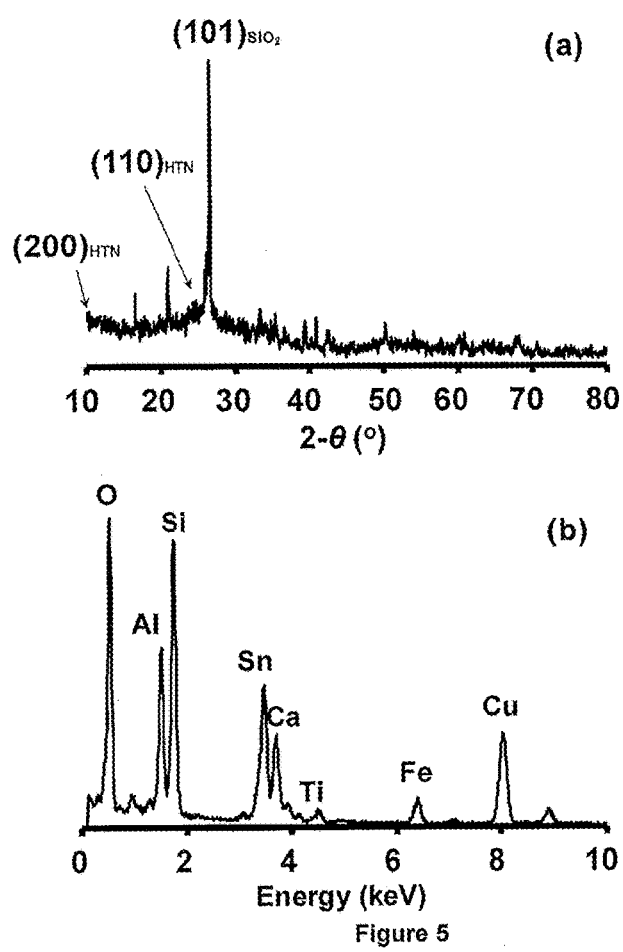
FIG. 5 represents the XRD pattern (a) and EDX spectrum (b) of micro-nano integrated HTN-flyash composite particles processed via an ion-exchange mechanism, operating under the dark-condition in an aqueous solution, using the $Sn^{2+}$ cations for the surface-sensitization of as-received flyash particles. The initial $SnCl_2$ concentration is 40 g·l$^{-1}$.

By merely stirring the aqueous suspension of mechanically mixed hydrothermally processed HTN and the as-received flyash particles, the former could not be adsorbed on (or attached to or anchored to) the surface of latter. In order to deposit HTN on the surface of as-received flyash particles, the following procedure has been adopted. 40 g·l$^{-1}$ of tin(II) chloride ($SnCl_2$, 97%, S.D. Fine-Chem, Mumbai, India) is dissolved in 100 ml of distilled-water having the initial solution-pH ~1.5 which is adjusted using the 1 M HCl solution under the continuous overhead stirring (Eurostar Digital, IKA, Germany) at 25° C. The dissolution time of $SnCl_2$ is 2 h. 1.0 g of as-received flyash particles is added to this clear-solution and the resulting suspension is stirred continuously at 25° C. for 4 h using an overhead stirrer to obtain the $Sn^{2+}$-sensitized flyash particles. 0.1 g of hydrothermally processed HTN are then added and the resulting suspension is sonicated (Bandelin Ultrasonic Bath, Aldrich-Labware, Bangalore, India) for 10 min followed by continuous stirring using an overhead stirrer at 25° C. for 4 h. The HTN are adsorbed on the surface of $Sn^{2+}$-sensitized flyash particles via an ion-exchange mechanism operating under the dark-condition in an aqueous solution. The resulting micro-nano integrated HTN-flyash composite particles (non-magnetic) are separated from the aqueous solution using a centrifuge (Hettich EBA 20, Sigma-Aldrich, India) operated at 3000 rpm. The separated HTN-flyash composite particles are then washed using 100 ml of distilled-water for 1 h multiple-times till the pH of filtrate remains unchanged or neutral. The washed composite particles are then dried in an oven at 80° C. for 12 h to obtain the HTN-flyash composite particles (non-magnetic) containing 69 wt. % Sn and 3 wt. % HTN (balance being the weight of flyash particles). The high magnification TEM images of the surface of as-received flyash particle and the interphase boundary within the micro-nano integrated HTN-flyash composite particle (non-magnetic) are shown in FIGS. 4(a) and 4(b). The surface of as-received flyash particle at very high magnification appears to be plain and featureless, FIG. 4(a). In FIG. 4(b), the interface boundary of HTN-flyash composite particle (non-magnetic) is clearly visible. The HTN are seen to be attached to or anchored to the surface of $Sn^{2+}$-sensitized flyash particles typically at the short-edges (or tube-openings) resulting in the formation of micro-nano integrated HTN-flyash composite particles (non-magnetic). The mechanism of HTN adsorption on the surface of $Sn^{2+}$-sensitized flyash particles is an ion-exchange process operating under the dark-condition in an aqueous solution. Since the as-received flyash particles are stirred in an acidic $SnCl_2$ solution, large amount of $Sn^{2+}$ ions are first adsorbed on the surface of as-received flyash particles. When the hydrothermally processed HTN are added to an aqueous suspension containing the $Sn^{2+}$-sensitized flyash particles, the former tend to pick-up the $Sn^{2+}$ ions, which are pre-adsorbed on the surface of flyash particles, for an exchange with the $H^+$ ions in their structure. However, since the $Sn^{2+}$ ions are already chemisorbed on the surface of as-received flyash particles and cannot leave the surface, the HTN get adsorbed on the surface of $Sn^{2+}$-sensitized flyash particles. Since the nanotubes-edge has higher energy than that of nanotubes-surface, the anchoring of HTN on the surface of $Sn^{2+}$-sensitized flyash particles primarily occurs at the shorter-edges (or the nanotubes-openings), FIG. 4(b), instead of along the length of nanotubes. The XRD pattern, FIG. 5(a), and the EDX spectrum, FIG. 5(b), further confirm the formation of HTN-flyash composite particles via an ion-exchange mechanism operating under the dark-condition in an aqueous solution.

Example-2

In this example, the values of different parameters used for the processing of micro-nano integrated HTN-flyash composite particles are identical with those already described in the Example 1 except for the following changes. The initial concentration of $SnCl_2$ and its dissolution time are varied as 5, 20, 40, and 60 g·l$^{-1}$ and 30 min, 2 and 4 h respectively. With these processing parameters, the HTN-flyash composite particles (non-magnetic) containing 44, 53, 69, and 77 wt. % Sn and 2, 3, 4, and 7 wt. % HTN respectively (balance being the weight of flyash particles) are obtained for the complete dissolution of $SnCl_2$ (dissolution time of 2 and 4 h).

The HTN-flyash composite particles processed under these conditions are utilized in the dye-adsorption experiments which are conducted at the neutral initial solution-pH of ~7.5 and in the dark-condition using the MB (methylene blue) as a model catalytic dye-agent. 125 ml aqueous solution is prepared by dissolving 15 μM of MB dye. 4.0 g·l$^{-1}$ of HTN-flyash composite particles are then dispersed in the MB dye solution and the resulting suspension is stirred continuously in the dark-condition for 180 min using an overhead stirrer. 8 ml aliquot is separated after each 10 or 30 min time interval for obtaining an absorption spectrum, using the UV-visible absorption spectrophotometer (UV-2401 PC, Shimadzu, Japan), of the filtrate obtained after separating the HTN-flyash composite particles using a centrifuge. The normalized concentration of surface-adsorbed MB dye is calculated using the equation of form, $$\% \ MB_{adsorbed} = \left(\frac{C_0 - C_t}{C_0}\right)_{MB} \times 100 \quad (1)$$

which is equivalent of the form, $$\% \ MB_{adsorbed} = \left(\frac{A_0 - A_t}{A_0}\right)_{MB} \times 100 \quad (2)$$

where, $C_0$ (mg·l$^{-1}$) and $C_t$ (mg·l$^{-1}$) correspond to the initial MB dye concentration at the start and after the contact time t with the corresponding absorbance of $A_0$ and $A_t$.

Figure 6:
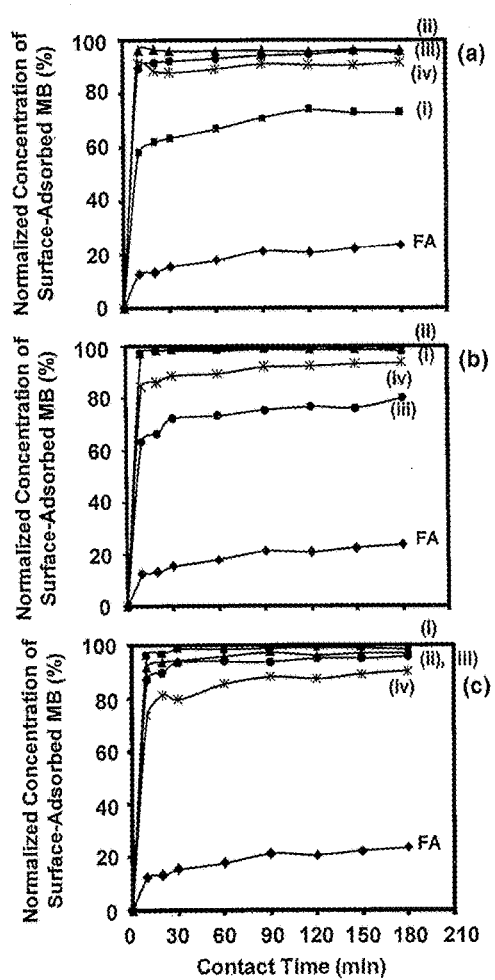
FIG. 6 represents the variation in the normalized concentration of surface-adsorbed MB dye as a function of contact time for the different dissolution time of $SnCl_2$ which is varied as 30 min (a), 2 h (b), and 4 h (c). The initial $SnCl_2$ concentration is varied as 5 (i), 20 (ii), 40 (iii), and 60 g·l$^{-1}$ (iv). The initial solution-pH during the dye-adsorption measurement is ~7.5.
Figure 7:
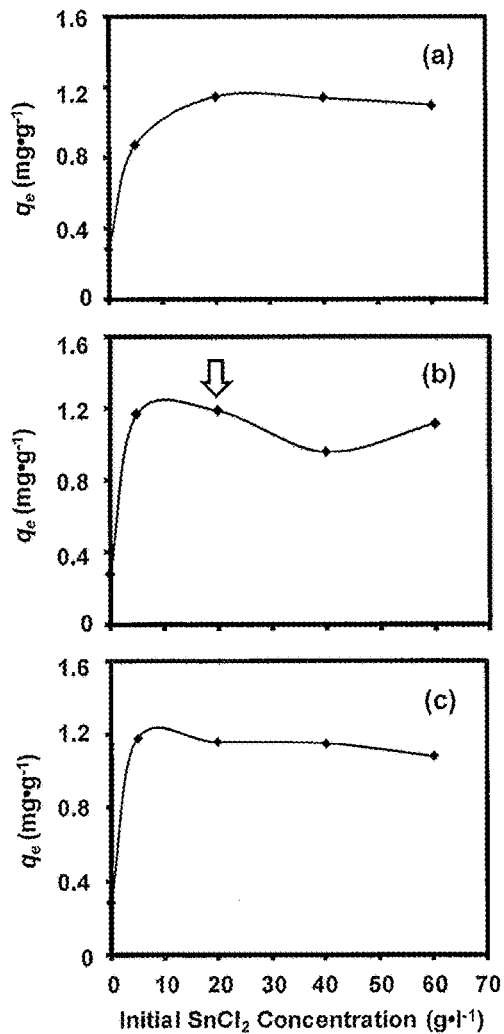
FIG. 7 represents the variation in $q_e$ as a function of initial $SnCl_2$ concentration obtained for the different dissolution time of $SnCl_2$ which is varied as 30 min (a), 2 h (b), and 4 h (c). The initial solution-pH during the dye-adsorption measurement is ~7.5. The maximum value of $q_e$ is indicated by an arrow.

The variation in the normalized concentration of surface-adsorbed MB dye as a function of contact time, as obtained for the micro-nano integrated HTN-flyash composite particles, is presented in FIG. 6(a)-6(c) for the different values of initial $SnCl_2$ concentration and its dissolution time. It is noted that, in general, the micro-nano integrated HTN-flyash composite particles show higher MB dye-adsorption on the surface relative to that of as-received flyash particles. The $Sn^{2+}$-cations remaining in the aqueous solution, typically at lower dissolution time of $SnCl_2$ and its higher concentrations, are seen to affect the adsorption of HTN on the surface of $Sn^{2+}$-sensitized flyash particles. The amount of MB dye adsorbed on the surface of micro-nano integrated HTN-flyash composite particles per unit mass of adsorbent ($q_e$) is calculated using the relationship of form, $$q_e = \frac{(C_0 - C_e) \times V}{m_{FA}} \quad (3)$$

where, $C_e$ (mg·l$^{-1}$) is the MB dye concentration within the solution at the equilibrium (that is, after the contact time of 180 min), V(l) the initial volume of MB dye solution, and $m_{HTN\text{-}FA}$ (g) the mass of micro-nano integrated HTN-FA composite particles used as dye-adsorbent. The obtained variation in $q_e$ as a function of initial $SnCl_2$ concentration, obtained for the different dissolution time of $SnCl_2$, is presented in FIG. 7. The as-received flyash particles exhibit the $q_e$ of 0.3 mg·g$^{-1}$. On the other hand, the maximum $q_e$ ($q_m$) of 1.2 mg·g$^{-1}$ is observed for the initial SnCl$_2$ concentration of 20 g·l$^{-1}$ and the dissolution time of 2 h, which suggests 4 times increase in the dye-adsorption capacity, at the solution-pH of ~7.5, due to the deposition of hydrothermally processed HTN on the surface of as-received flyash particles via an ion-exchange mechanism operating in the dark-condition.

Thus, under the given test-conditions, the HTN-flyash composite particles exhibit higher MB dye adsorption capacity than that of as-received flyash particles. The initial SnCl$_2$ concentration of 20 g·l$^{-1}$ and the dissolution time of 2 h are determined to be the most optimum conditions leading to the maximum MB dye-adsorption on the surface of HTN-flyash composite particles in the dark-condition. Since in the literature, the capacity of as-received flyash particles for the adsorption of cationic MB dye is shown to be insensitive to the initial solution-pH; while, that of hydrothermally processed HTN is shown to be drastically enhanced and reached its maximum value at the initial solution-pH of ~10 (within the range of ~2.5-11), it is obvious that the difference in the dye-adsorption capacity of HTN-flyash composite particles (non-magnetic) and that of as-received flyash particles, at the initial solution-pH of ~10, would be the highest and more than that observed at the initial solution-pH of ~7.5.

Example-3

In this example, the values of different parameters used for the processing of micro-nano integrated HTN-flyash composite particles are identical with those already described in the Example 1 except for the following changes. The initial SnCl$_2$ concentration is changed to 20 g·l$^{-1}$. Both the contact time of SnCl$_2$ solution with the suspended as-received flyash particles and that of the hydrothermally processed HTN with the Sn$^{2+}$-sensitized flyash particles are varied in the range of 1-4 h at the interval of 1 h. The HTN-flyash composite particles processed under these conditions contain 53 wt. % Sn and 4 wt. % HTN (balance being the weight of flyash particles) and are utilized in the MB dye-adsorption experiments, conducted in the dark-condition, as described above in the Example-2.

Figure 8:
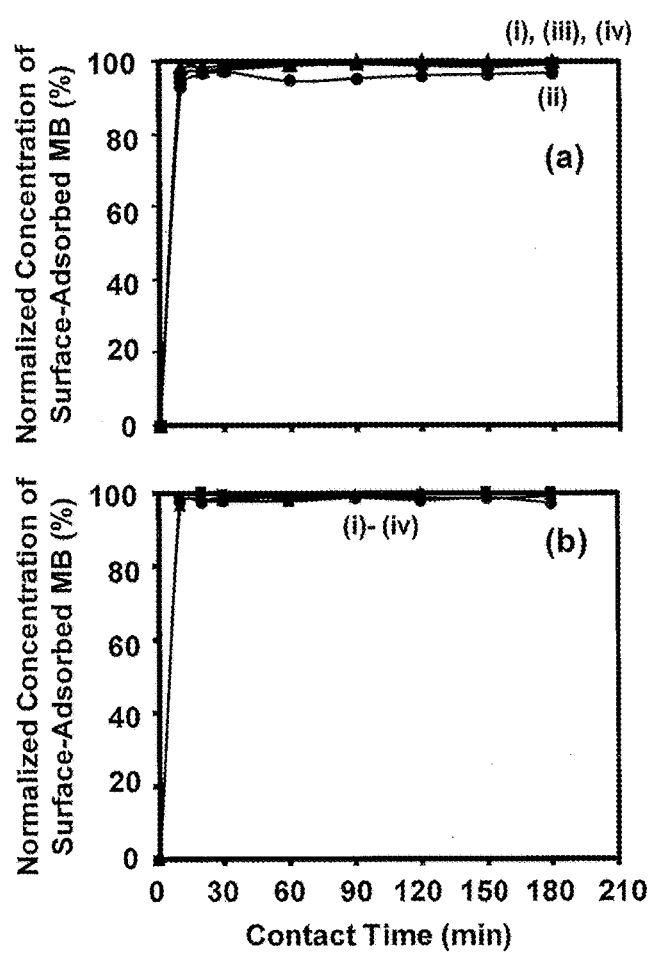
FIG. 8 represents the variation in the normalized concentration of surface-adsorbed MB dye as a function of contact time obtained for the HTN-flyash composite particles (non-magnetic) processed using the different contact time of $SnCl_2$ solution with the as-received flyash particles (a) and that of the hydrothermally processed HTN with the $Sn^{2+}$-sensitized flyash particles (b). (i)-(iv) represent the contact time of 1-4 h at the interval of 1 h. The initial $SnCl_2$ concentration and its dissolution time are 20 g·l$^{-1}$ and 2 h. In (a), the contact time HTN and $Sn^{2+}$-activated flyash particles is 4 h. In (b), the contact time $SnCl_2$ solution with the suspended as-received flyash particles is 4 h.

The obtained variation in the normalized concentration of surface-adsorbed MB dye as a function of contact time, as obtained for the micro-nano integrated HTN-flyash composite particles, for the different contact time of SnCl$_2$ solution with the as-received flyash particles, FIG. 8(a), and that of the HTN with the Sn$^{2+}$-sensitized flyash particles, FIG. 8(b). It is noted that, for both the contact time within the range of 1-4 h, the MB dye adsorption remains almost 100%. Hence, within the investigated range of parameters, the contact time of SnCl$_2$ solution with the as-received flyash particles and that of the HTN with the Sn$^{2+}$-sensitized flyash particles do not have any significant effect on the amount of MB dye adsorbed on the surface of HTN-flyash composite particles.

Thus, considering that higher amount of HTN (greater than ~10%) could be adsorbed on the surface of Sn$^{2+}$-sensitized flyash particles, the optimum contact time of SnCl$_2$ solution with the as-received flyash particles and that of HTN with the Sn$^{2+}$-sensitized flyash particles are determined to be 4 h.

Example-4

In this example, the values of different parameters used for the processing of micro-nano integrated HTN-flyash composite particles are identical with those already described in the Example 1 except that the initial concentration of SnCl$_2$ is 20 g·l$^{-1}$. The HTN-flyash composite particles processed under these conditions contain 53 wt. % Sn and 4 wt. % HTN (balance being the weight of flyash particles) are utilized in the MB dye-adsorption experiments, conducted in the dark-condition, as described earlier in the Example-2 except that the initial MB dye concentration is varied in the range of 15-90 µM.

Figure 9:
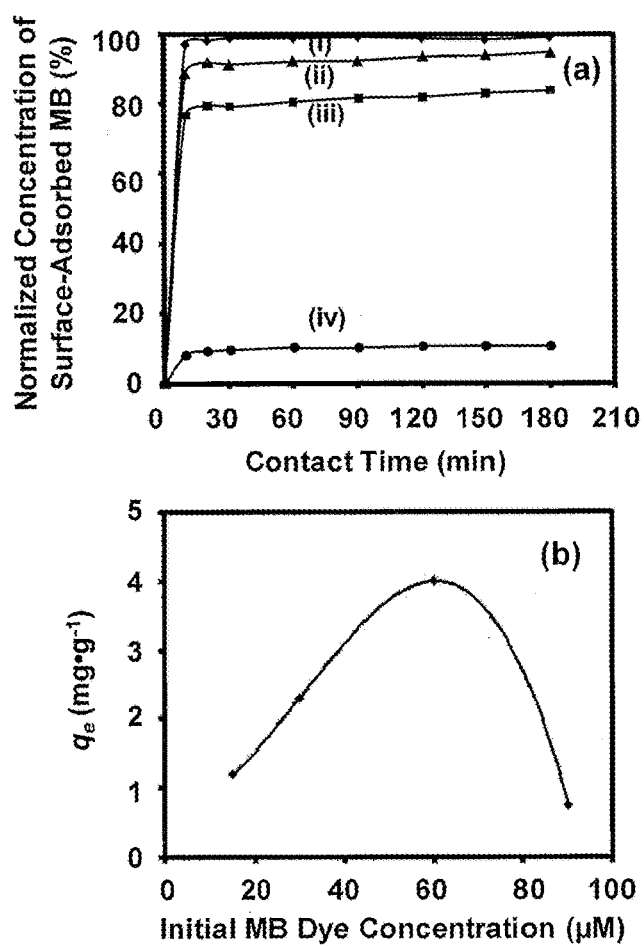
FIG. 9 represents (a) the variation in the normalized concentration of surface-adsorbed MB dye as a function of contact time obtained for the different initial MB dye concentrations which is varied as 15 (i), 30 (ii), 60 (iii), and 90 μM (iv) measured at the initial solution-pH of ~7.5. (b)

The variation in the normalized concentration of surface-adsorbed MB dye as a function of contact time, as obtained for the micro-nano integrated HTN-flyash composite particles, for the different initial MB dye concentration, is presented in FIG. 9(a). The amount of surface-adsorbed MB dye, at equilibrium, is seen to decrease with increasing initial MB dye concentration. The corresponding variation in $q_e$ as a function of initial MB dye concentration is presented in FIG. 9(b). The maximum value of $q_e$ ($q_m$), under these test-conditions, is noted be 4 mg·g$^{-1}$, which is 13 times higher than that (0.3 mg·g$^{-1}$) of as-received flyash particles as determined under the similar test-conditions.

Thus, under the neutral initial solution-pH of ~7.5, the dye-adsorption capacity of HTN-flyash composite particles is higher than that of as-received flyash particles. It is obvious that by changing the initial solution-pH within the range of 7.5-11, the dye-adsorption capacity of HTN-flyash composite would be further enhanced (typically at the initial solution-pH of ~10) relative to that of as-received flyash.

Example-5

In this example, Ag-doped ATN with varying Ag/Ti mole-ratio (0, 1, and 5%) are synthesized via the conventional hydrothermal method as already described in the Example 1 except that the as-received anatase-TiO$_2$ precursor is replaced with the Ag-doped anatase-TiO$_2$ processed with varying Ag/Ti mole-ratio (0, 1, and 5%). The latter is processed via the conventional sol-gel method modified using the acetic acid (CH$_3$COOH) as a catalyst. The molar-ratio of CH$_3$COOH catalyst to Ti(OC$_3$H$_5$)$_4$ precursor, involved in the modified sol-gel process, is 10. The molar-ratio of water to alkoxide-precursor (R-value) is 90. The CH$_3$COOH-catalyst is essential in the modified sol-gel process to dissolve Ag into the TiO$_2$ lattice without causing the anatase-to-rutile phase transformation during the calcination treatment which is conducted at higher temperature at 600° C. for 2 h. In contrast to the formation of HTN as described in the Example 1, the nanotubes formed in this example are observed to be ATN, FIG. 10. The pure and Ag-doped ATN processed under these conditions are then utilized in the MB dye-adsorption experiments, conducted in the dark-condition, as described earlier in the Example-2 except that the initial MB dye concentration is varied in between 7.5-250 µM.

The obtained variation in $q_e$ as a function of initial MB dye concentration, as obtained using the pure and Ag-doped ATN with varying Ag/Ti mole-ratio (0, 1, and 5%), is presented in FIG. 11(a). The maximum value of $q_e$ ($q_m$) is noted be 38 mg·g$^{-1}$ as observed for the Ag-doped ATN having 1% Ag/Ti mole-ratio. Hence, it is obvious that Ag-doped ATN-flyash composite particles would exhibit higher MB dye-adsorption capacity than that of pure ATN-flyash composite particles, which is demonstrated in FIG. 11(b). Hence, the doping of noble-metal increases the dye-adsorption capacity of ATN (or HTN) and also that of semiconductor-oxide nanotubes-flyash composite particles.

It is obvious that doping ATN or HTN with other noble-metals such as Au, Pt, and Pd as well as non-noble metals such as Gd, Zn, Mn, Cu, and others, would also increase the dye-adsorption capacity of ATN (or HTN)-flyash composite particles. It is also obvious that the other techniques including the surface-deposition of noble-metal catalyst nanoparticles, such as Au, Pt, Pd, Ag, and others, on the surface of ATN (or HTN)-flyash composite particles would increase their dye-adsorption capacity.

Example-6

In this example, the anatase-$TiO_2$-coated (cycle-5) $SiO_2$/$\gamma$-$Fe_2O_3$ magnetic nanocomposite particles are first prepared via the modified-Stober and the conventional sol-gel processes. To 2 g suspension of nanocrystalline magnetic $\gamma$-$Fe_2O_3$ particles dispersed in 250 ml of ethanol, 14.5 ml of tetraethylorthosilicate (TEOS, 98%, Sigma-Aldrich, India) is slowly added and stirred for 1 h using an overhead stirrer. This is followed by the drop-wise addition of mixture of 2.3 ml of $NH_4OH$ (25 wt. %, Qualigens Fine Chemicals, India) and 63.4 ml of distilled-water and the suspension is stirred for 12 h. The resulting product is collected via magnetic separation (magnetic separator, Sigma-Aldrich Labware, Bangalore, India), washed first with 100 ml of ethanol and four times with distilled-water followed by drying in an oven at 80° C. for 12 h. By this process, the $SiO_2$/$\gamma$-$Fe_2O_3$ magnetic nanocomposite particles containing 66 wt. % $SiO_2$ and 34 wt. % $\gamma$-$Fe_2O_3$ are obtained.

In order to deposit the nanocrystalline anatase-$TiO_2$, 2 g of $SiO_2$/$\gamma$-$Fe_2O_3$ magnetic nanoparticles are suspended in a solution of 0.5 g of titanium(IV) iso-propoxide ($Ti(OC_3H_7)_4$, 97%, Sigma-Aldrich, Bangalore, India) dissolved in 125 ml 2-propanol. To this suspension, a solution consisting 0.15 ml of distilled water (R=5, defined as the ratio of molar concentration (final) of water to that of alkoxide-precursor) dissolved in 125 ml of 2-propanol, was added drop wise. The resulting suspension is stirred for 12 h and the magnetically separated powder is then washed with 100 ml of 2-propanol and then dried in an oven at 80° C. overnight. The sol-gel process is repeated for total 5 cycles to control the thickness of amorphous-$TiO_2$ coating which is then converted to anatase-$TiO_2$ via the calcination treatment (heating rate=3° C.·$min^{-1}$) of the dried-powder conducted at 600° C. for 2 h. The anatase-$TiO_2$-coated (cycle-5) $SiO_2$/$\gamma$-$Fe_2O_3$ magnetic nanocomposite, thus obtained, contains 26 wt. % $TiO_2$, 25 wt. % $\gamma$-$Fe_2O_3$, and 49 wt. % $SiO_2$ and is referred here as a "magnetic photocatalyst". The corresponding SEM image, EDX spectrum, and XRD pattern of magnetic photocatalyst are presented in FIG. 12(a)-12(c) respectively. Being magnetic in nature, the anatase-$TiO_2$-coated (cycle-5) $SiO_2$/$\gamma$-$Fe_2O_3$ magnetic photocatalyst can be separated from an aqueous solution using an external magnetic field as demonstrated in FIG. 13. (Note: $\gamma$-$Fe_2O_3$ is a ferrimagnetic material with the saturation magnetization of 74 emu·$g^{-1}$).

The free-OH. trapping experiments are performed, using the terepthalic acid (TA, 98%, Sigma-Aldrich Chemicals, Bangalore, India), which are produced under the continuous solar-radiation exposure of two separate aqueous suspensions containing the suspended particles of as-received flyash particles or the HTN-flyash composite particles (non-magnetic) and the magnetic photocatalyst. 500 μM of TA and 2000 μM of NaOH (assay 97%, S.D. Fine-Chem, Mumbai, India) are first dissolved in 125 ml of aqueous solution. Either 3.2 g·$l^{-1}$ of magnetic photocatalyst or 24 g·$l^{-1}$ of as-received flyash particles (or HTN-flyash composite particles) are suspended in this solution. The resulting suspension is stirred continuously using an overhead stirrer under the solar-radiation exposure for 5 h. The free-OH. produced by the as-received flyash particles (or the HTN-flyash composite particles) and the magnetic photocatalyst particles, under the solar-radiation exposure, are trapped by the TA resulting in the formation of 2-hydroxyterephthalic acid. The aliquots are collected at the 1 h time interval and the solid-particles are separated using either a centrifuge or a magnetic separator. The filtrate is analyzed to obtain the photoluminescence (PL) spectra of 2-hydroxyterephthalic acid which exhibits a characteristic PL peak located at ~625 nm, the intensity of which is recorded as a function of UV-radiation exposure time using the spectrofluorometer (Cary Eclipse, Varian, The Netherlands) at an excitation wavelength of ~315 nm. The intensity of PL peak is regarded as the measure of amount of free-OH. produced by the catalyst-particles at a given time under the solar-radiation exposure.

The variation in the PL intensity of 2-hydroxyterepthalic acid as a function of solar-radiation exposure time, as observed for the as-received flyash particles (or HTN-flyash composite particles) and the magnetic photocatalyst, is presented in FIGS. 14(a) and 14(b). It is observed that, for both the samples, the concentration of free-OH. produced increases with increasing solar-radiation exposure time. However, the comparison shows that the as-received flyash particles (or HTN-flyash composite particle) do not generate appreciable amount of free-OH' under the solar-radiation exposure. On the other hand, large amount of free-OH. are produced by the magnetic photocatalyst. This suggests that the magnetic photocatalyst should possess better photocatalytic activity under the solar-radiation exposure than that of the as-received flyash particles (or HTN-flyash composite particles). Since the latter has relatively higher dye-adsorption capacity under the dark-condition, it appears that the previously adsorbed-dye can be easily decomposed on the surface on as-received flyash particles (or HTN-flyash composite particles) by the attack of free-OH. produced by the magnetic photocatalyst provided both the materials are mechanically mixed and suspended in the same aqueous dye-solution which is exposed to the solar-radiation. It further appears that from the mechanical mixture of as-received flyash particles (or HTN-flyash composite particles) and the magnetic photocatalyst, both the powders can be separated from their mechanical mixture using an external magnetic field. This allows the recycling of as-received flyash particles (or HTN-flyash composite particles) for the next-cycle of dye-adsorption conducted in the dark-condition using the magnetic photocatalyst for their surface-cleaning treatment.

In order to demonstrate this, the as-received flyash particles are used for the multiple MB dye-adsorption cycles (#4) conducted in the dark-condition. All experimental parameters used for these dye-adsorption measurements are identical to those described earlier the Example 2 except for the following changes. The initial concentration of MB dye and that of adsorbent are 7.5 μM and 24 g·$l^{-1}$. In order to remove the previously adsorbed MB dye from the surface, 3 g of as-received flyash particles with the surface-adsorbed MB dye (0.24 mg·$g^{-1}$), as obtained after the cycle-4 of dye-adsorption as mentioned above, is first suspended in 125 ml of distilled-water under continuous overhead stirring. Then, 1 g of anatase-$TiO_2$-coated (cycle-5) $SiO_2$/$\gamma$-$Fe_2O_3$ magnetic photocatalyst (containing 26 wt. % $TiO_2$, 25 wt. % $\gamma$-$Fe_2O_3$, and 49 wt. % $SiO_2$) is added to the above suspension under the continuous overhead stirring. The resulting suspension is stirred continuously under the solar-radiation exposure for 6 h, which results in the decomposition of MB dye adsorbed on the surface of as-received flyash particles due to the large concentration of free-OH. radicals produced by the magnetic photocatalyst under these test-conditions. This is then followed by the separation of surface-cleaned non-magnetic flyash particles mixed with the magnetic photocatalyst particles using a centrifuge operated at 3000 rpm and the washing of mixed solid particles using 100 ml of distilled-water for 1 h multiple-times till the pH of filtrate remains unchanged or neutral. The magnetic and non-magnetic components are then separated using an external magnetic field and dried in an oven at 80° C. for 12 h. The surface-cleaned flyash particles, hence, could be recycled for the next-cycle of dye-adsorption conducted in the dark-condition as demonstrated in FIG. 15. The $q_e$ is noted decrease with increasing number of dye-adsorption cycles conducted in the dark-condition. The surface-cleaning treatment, as described above, is applied after the dye-adsorption cycle-4, to decompose the previously adsorbed-dye from the surface, which results in a drastic increase in the dye-adsorption capacity of as-received flyash particles which is comparable with that observed in the cycle-1.

Thus, the recycling of as-received flyash particles is successfully achieved here by decomposing the previously-adsorbed dye from their surfaces by mixing them with a magnetic photocatalyst (typically anatase-$TiO_2$-coated (cycle-5) $SiO_2/\gamma$-$Fe_2O_3$) in an aqueous solution and exposing the resulting suspension to the solar-radiation. It is obvious that the other "core-shell" type magnetic photocatalysts having different magnetic core such as $CoFe_2O_4$, $NiFe_2O_4$, $MnFe_2O_4$, Ni, Fe, Co, and others, in combination with the shell of other nanocrystalline semiconductor photocatalyst such as ZnO, CdS, ZnS, and others, are also suitable for recycling the as-received flyash particles and the micro-nano integrated HTN-flyash composite particles for the dye-removal application. The magnetic photocatalyst having the morphology other than the "core-shell" structure, such as the nanoparticles of magnetic material deposited on the surface of semiconductor-oxide nanotubes may be also used.

Example-7

In this example, the values of different parameters used for the processing of micro-nano integrated HTN-flyash composite particles are identical with those already described in the Example 1 except for the following changes. The $SnCl_2$ precursor having the initial concentration of 40 g·l$^{-1}$ is replaced with $Fe(NO_3)_3.9H_2O$ precursor having the initial concentration of 20 g·l$^{-1}$. for surface-sensitizing the as-received flyash particles with $Fe^{3+}$ cations instead of $Sn^{2+}$. By this process, the HTN-flyash composite particles (non-magnetic) containing 20 wt. % Fe and 7 wt. % HTN (balance being the weight of flyash particles) are obtained.

The TEM images and the EDX pattern as obtained using the HTN-flyash composite particles, with the surface-sensitization of flyash particles obtained using the $Fe^{3+}$ cations, are presented in FIG. 16(a)-(b) and 16(c). Similar to the observation made in FIG. 4(b), the HTN are noted to be attached to or anchored to the surface of flyash particles, surface-sensitized with the $Fe^{3+}$ cations, typically at the short-edges (tube-openings) which confirms the operation of ion-exchange mechanism operating under the dark-condition in an aqueous solution. The comparison of EDX spectrum with that of as-received flyash particles, FIG. 3(a), show an increase in the intensity of Fe and Ti peaks, suggesting the formation of HTN-flyash composite particles via the $Fe^{3+}$ sensitization.

The as-received flyash particles and the HTN-flyash composite particles are then utilized in the MB dye-adsorption experiments, conducted in the dark-condition, as described earlier in the Example-2 except that the initial MB dye concentration of 30 µM is used in this example. The variation in the normalized concentration of surface-adsorbed MB dye as a function of contact time, as obtained for the as-received flyash particles and micro-nano integrated HTN-flyash composite particles (latter surface-sensitized with $Fe^{3+}$ ions), is presented and compared in FIG. 17. Relative to the equilibrium MB dye adsorption exhibited by the as-received flyash particles, the amount of MB dye adsorbed at equilibrium is seen to enhance due to the anchoring of HTN on the surface of flyash particles which are pre-sensitized with the $Fe^{3+}$ cations.

Example-8

In this example, the values of different parameters used for the processing of micro-nano integrated HTN-flyash composite particles are identical with those already described in the Example 1 except for the following changes. The $SnCl_2$ precursor is not utilized for surface-sensitizing the as-received flyash particles with $Sn^{2+}$ cations. The surface-sensitization of as-received flyash particles is achieved using the adsorption of $H^+$ ions instead. The contact time of HCl solution with the as-received flyash particles is 1 h instead of 4 h. By this process, the HTN-flyash composite particles (non-magnetic) containing ~2 wt. % H and 9 wt. % HTN (balance being the weight of flyash particles) are obtained.

The TEM image and EDX pattern of HTN-flyash composite particles, processed via the surface-sensitization of flyash using the $H^+$ ions, are presented in FIGS. 18(a) and 18(b). The as-received flyash particles and the HTN-flyash composite particles are then utilized in the MB dye-adsorption experiments, conducted in the dark-condition, as described earlier in the Example-2 except that the initial MB dye concentration of 15 µM is used in this example. The variation in the normalized concentration of surface-adsorbed MB dye as a function of contact time, as obtained for the as-received flyash particles and micro-nano integrated HTN-flyash composite particles (with latter surface-sensitized with $H^+$ ions), is presented and compared in FIG. 19. Relative to the equilibrium MB dye adsorption exhibited by the as-received flyash particles, the amount of MB dye adsorbed at equilibrium is seen to enhance due to the anchoring of HTN on the surface of flyash particles which are pre-sensitized with the $H^+$ ions.

Example-9

In this example, the HTN-$\gamma$-$Fe_2O_3$ magnetic nanocomposite is synthesized via an innovative approach involving an ion-exchange mechanism operating under the dark-condition in an aqueous solution. As mentioned in the Example 7, $Fe^{3+}$ cations can be used as the surface-sensitizer for the as-received flyash particles to anchor the HTN to their surfaces. Since the magnetic $\gamma$-$Fe_2O_3$ is the oxide of $Fe^{3+}$ ions, the surface-sensitization step is not necessary and may be eliminated to anchor the HTN to the surface of $\gamma$-$Fe_2O_3$ via an ion-exchange mechanism operating under the dark-condition in an aqueous solution.

To demonstrate this, 0.5 g (or 0.1 g) of γ-$Fe_2O_3$ are dispersed in 125 ml of distilled-water having the neutral solution-pH (~6.5-7.5) under the continuous overhead stirring at 25° C. for 10 min. 0.5 g (or 0.9 g) of hydrothermally processed HTN are then added to the above suspension under the continuous overhead stirring at 25° C. for 10 min. The resulting suspension is sonicated for 10 min and then stirred continuously under the dark-condition at 25° C. for 8 h using an overhead stirrer. The nano-nano integrated HTN-γ-$Fe_2O_3$ magnetic nanocomposite particles, thus formed, are separated from the aqueous solution using an external magnetic field, washed using 100 ml of distilled water for 1 h multiple-times till the pH of filtrate remains unchanged or neutral, again separated from the aqueous solution using an external magnetic field, and then dried in an oven at 80° C. for 12 h to obtain the HTN-γ-$Fe_2O_3$ magnetic nanocomposite particles containing 50 wt. % (or 10 wt. %) of γ-$Fe_2O_3$ particles (balance being the weight of HTN).

The TEM image of as-received nanocrystalline γ-$Fe_2O_3$ particles is shown in FIG. 20(a) and the corresponding EDX spectrum is presented in FIG. 20(b). The size of as-received nanocrystalline γ-$Fe_2O_3$ magnetic particles is within the range of 15-25 nm having near-spherical morphology. The EDX spectrum confirms the presence Fe and O within these nanoparticles. The selected-area electron diffraction (SAED) pattern, shown as an inset in FIG. 20(a), exhibits the concentric ring pattern indicating the nanocrystalline nature of as-received γ-$Fe_2O_3$ nanoparticles in agreement with the TEM image. The XRD pattern of as-received γ-$Fe_2O_3$ nanoparticles is presented in FIG. 20(c). The as-received magnetic nanoparticles possesses maghemite (γ-$Fe_2O_3$) structure as confirmed after comparing the XRD pattern with the JCDPS card no. 39-1346. The TEM images of HTN-γ-$Fe_2O_3$ magnetic nanocomposites are shown in FIG. 21, which clearly shows the attaching or anchoring of HTN at the short-edges (tube-openings) to the surface of γ-$Fe_2O_3$ magnetic nanoparticles via an ion-exchange mechanism operating under the dark-condition in an aqueous solution. It is noted that the magnetic nanoparticles are not dispersed along the surface of HTN which makes large number of potential-sites available for the dye-adsorption process, which could not be possible if the magnetic nanoparticles would have been dispersed along the surface of HTN. It appears that the attaching or anchoring of HTN typically at the short-edges (tube-openings) to the surface of γ-$Fe_2O_3$ magnetic nanoparticles via an ion-exchange mechanism takes place only at the neutral solution-pH. Similar process conducted in an acidic or basic range may lead to the formation of HTN-γ-$Fe_2O_3$ magnetic nanocomposites with the magnetic nanoparticles dispersed along the surface of HTN via the electrostatic attraction mechanism involving both the coulombic and van der Waals forces. The EDX pattern obtained using the HTN-γ-$Fe_2O_3$ magnetic nanocomposites, corresponding to FIG. 21(b), is shown in FIG. 22 which shows the presence of Ti and Fe as the major elements confirming the formation of nanocomposite particles. It is to be noted that the γ-$Fe_2O_3$ magnetic nanoparticles are not surface-sensitized for attaching or anchoring the HTN to their surfaces, which is however an essential step in the case of as-received flyash particles as described in the Example 1. In FIG. 23, the use of HTN-γ-$Fe_2O_3$ magnetic nanocomposite particles for the removal of MB dye from an aqueous solution, via the surface-adsorption process involving the ion-exchange and electrostatic-attraction mechanisms operating in the dark-condition has been demonstrated. The separation of HTN-γ-$Fe_2O_3$ magnetic nanocomposite particles, after the MB dye adsorption on the surface, using a moderate external magnetic field is clearly visible.

Thus, the processing of semiconductor-oxide nanotubes (HTN)-metal oxide (γ-$Fe_2O_3$) magnetic nanocomposite particles is successfully demonstrated, without the surface-sensitization step, via an innovative process involving an ion-exchange mechanism operating under the dark-condition in an aqueous solution.

Example-10

Similar to the Example 6, the previously adsorbed-dye can be decomposed on the surface of HTN-γ-$Fe_2O_3$ magnetic nanocomposite by mechanically mixing and suspending it with the non-magnetic nanocrystalline anatase-$TiO_2$ photocatalyst (~3-30 nm average diameter) in an aqueous solution and exposing the resulting suspension to the UV or solar-radiation under the continuous overhead stirring till the adsorbed-dye is completely decomposed. Large concentration of OH. is produced by the nanocrystalline anatase-$TiO_2$ photocatalyst in shorter time relative to that produced by the HTN and γ-$Fe_2O_3$, FIG. 24, which attack and decompose the MB dye adsorbed on the surface of magnetic nanocomposite particles in relatively less time. The HTN-γ-$Fe_2O_3$ (5 wt. %) magnetic nanocomposite particles (1.0 g) are first prepared using the procedure described in the Example-9 except that the amount of γ-$Fe_2O_3$ and HTN used are changed to 0.05 g and 0.95 g. The magnetic nanocomposite particles are then suspended and stirred at 25° C. for 1 h in the dark-condition using an overhead stirrer in 125 ml aqueous solution of MB dye (30 μM). After the magnetic separation, the magnetic nanocomposite particles with the surface-adsorbed MB dye are dried in an oven at 80° C. for 12 h. Two different sets of samples are prepared. One set of HTN-γ-$Fe_2O_3$ (5 wt. %) magnetic nanocomposite particles with the surface-adsorbed MB dye are then used for the dye-adsorption experiment conducted with the initial MB dye concentration of 100 μM. The second set of HTN-γ-$Fe_2O_3$ (5 wt. %) magnetic nanocomposite particles with the surface-adsorbed MB dye are subjected to the surface-cleaning treatment. In this treatment, 1.0 g of HTN-γ-$Fe_2O_3$ (5 wt. %) magnetic nanocomposite particles with the surface-adsorbed MB dye (1.2 mg·$g^{-1}$) is suspended in 125 ml aqueous solution under the continuous overhead stirring. 1.0 g (50 wt. % of total amount of suspended solid particles) of non-magnetic nanocrystalline anatase-$TiO_2$ photocatalyst is then added. The resulting suspension is sonicated for 15 min and then stirred at 25° C. using an overhead stirrer under the UV-radiation exposure for 2 h. The mixture of surface-cleaned magnetic nanocomposite particles and the non-magnetic nanocrystalline anatase-$TiO_2$ photocatalyst are separated together using a centrifuge operated at 3000 rpm and washed using 100 ml of distilled-water for 1 h multiple-times till the pH of filtrate remains unchanged or neutral. The surface-cleaned magnetic nanocomposite particles are separated from the non-magnetic nanocrystalline anatase-$TiO_2$ photocatalyst using an external magnetic field. The separated powders are dried in an oven at 80° C. for 12 h. The surface-cleaned magnetic nanocomposite particles are recycled for the next-cycle of dye-adsorption conducted in the dark-condition using an aqueous solution containing 100 μM of MB dye. The variation in the normalized concentration of surface-adsorbed MB dye as a function of contact time as obtained for the HTN-γ-$Fe_2O_3$ (5 wt. %) magnetic nanocomposite particles, before and after surface-cleaning treatment, is presented in FIG. 25. In 30 μM MB dye solution, the HTN-γ-

$Fe_2O_3$ (5 wt. %) magnetic nanocomposite particles adsorb almost 100% of dye on the surface. If the MB dye adsorption is conducted, without the surface-cleaning treatment, using an aqueous solution containing 100 μM of MB dye, then the amount of dye-adsorbed on the surface of nanocomposite particles is noted be 50%. On the other hand, if the MB dye adsorption is conducted, after the surface-cleaning treatment, using an aqueous solution containing 100 μM of MB dye, then the amount of dye-adsorbed on the surface of nanocomposite particles is noted be 90%. The increase in the amount of dye-adsorption after the surface-cleaning treatment is, thus, clearly visible. This strongly suggests the successful decomposition of previously adsorbed-dye on the surface of HTN-γ-$Fe_2O_3$ (5 wt. %) magnetic nanocomposite particles by mixing them with the non-magnetic nanocrystalline anatase-$TiO_2$ photocatalyst in an aqueous solution and subjecting the suspension to the UV-radiation. It is obvious that any other non-magnetic photocatalyst, including CdS, ZnS, and other, may be selected for the surface-cleaning treatment instead of anatase-$TiO_2$.

It is to be noted that the pure nanocrystalline anatase-$TiO_2$ used for the surface-cleaning treatment get attached to (or anchored to) the HTN-γ-$Fe_2O_3$ magnetic nanocomposite particles via an ion-exchange mechanism operating the under the dark-condition in an aqueous solution. As a result, some amount of (non-magnetic) photocatalyst particles is lost after the magnetic separation. This has been observed to affect the amount of dye-adsorbed by the HTN-γ-$Fe_2O_3$ magnetic nanocomposite particles in the subsequent dye-adsorption cycles ($2^{nd}$ cycle) following the surface-cleaning treatment. The latter issue becomes severe with the increasing number of dye-adsorption cycles. This is also particularly noted for the industry effluent sample containing a cold reactive dye (Red M5B). In order to avoid the interaction between the HTN-γ-$Fe_2O_3$ magnetic nanocomposite particles and the nanocrystalline anatase-$TiO_2$ photocatalyst particles, (that is to minimize the operation of an ion-exchange mechanism in between the two), the latter is required to be coated with the noble-metal selected from the group of Pt, Au, Pd, Ag, nanoparticles which can not only reduce the said interaction but also help enhance the concentration of OH. produced under the radiation-exposure. This has been demonstrated in the following example using the above industry effluent sample received from the Rubmach Industries, Ahmedabad, Gujarat, India.

Example-11

In this example, Pt is first deposited on pure anatase-$TiO_2$ via the UV-reduction process. First, platinum(II) chloride ($PtCl_2$) is dissolved in a proper concentration range in 200 ml of distilled $H_2O$ under the continuous magnetic stirring. 1 g of pure anatase-$TiO_2$ is then dispersed so as to obtain the Pt/Ti mole-ratio varying in the range of 1, 5, and 10%. The initial solution-pH is then adjusted to ~10 by the addition of $NH_4OH$ solution. The resulting suspension is then exposed to the UV-radiation in a Photoreactor (Luzchem, Canada) for 4 h. The Pt-deposited nanocrystalline anatase-$TiO_2$ is separated using a centrifuge operated at 3000 rpm and dried in an oven at 80° C. for 12 h. A typical TEM image of Pt-deposited nanocrystalline anatase-$TiO_2$ having the Pt/Ti mole-ratio of 5% is shown in FIG. 26(a) where very fine Pt nanoparticles dispersed on the surface of one of the nanocrystalline anatase-$TiO_2$ particle is clearly seen.

In order to prepare HTN-γ-$Fe_2O_3$ (10 wt. %) magnetic nanocomposite particles, the procedure already described in the Example-9 is followed. 0.3 g of HTN-γ-$Fe_2O_3$ (10 wt. %) magnetic nanocomposite particles are first suspended and stirred using an overhead stirrer in the dark-condition at 25° C. for 1 h in 125 ml aqueous solution containing 1 vol. % industry effluent sample. (NOTE: The industry effluent sample contains 10% of cold reactive Red M5B dye). The magnetic nanocomposite particles with the surface-adsorbed reactive-dye are separated using a magnetic separator and dried in an oven at 80° C. for 12 h. The second-cycle of dye-adsorption is conducted using the dried magnetic nanocomposite particles having the previously adsorbed reactive-dye on the surface. In another set of experiments, HTN-γ-$Fe_2O_3$ (10 wt. %) magnetic nanocomposite particles with the surface-adsorbed reactive-dye are prepared, which are subjected to the surface-cleaning treatment under the UV-radiation exposure using the Pt-deposited nanocrystalline anatase-$TiO_2$ having the varying Pt/Ti mole-ratio within the range of 1-10%. During the surface-cleaning treatment, 0.3 g of HTN-γ-$Fe_2O_3$ (10 wt. %) magnetic nanocomposite particles with the surface-adsorbed reactive-dye is suspended in 100 ml aqueous solution under the continuous overhead stirring at 25° C. for 10 min. 0.3 g (50 wt. % of total amount of suspended solid particles) of non-magnetic Pt-deposited nanocrystalline anatase-$TiO_2$ photocatalyst is then added under the continuous overhead stirring at 25° C. for 10 min. The resulting suspension is sonicated for 10 min and then stirred using an overhead stirrer under the UV-radiation exposure for 5 h. Due to the Pt-deposition, the HTN within the magnetic nanocomposite particles are not attached to (or anchored to) the nanocrystalline anatase-$TiO_2$ photocatalyst particles. The mixture of surface-cleaned magnetic nanocomposite particles and the non-magnetic nanocrystalline Pt-deposited anatase-$TiO_2$ photocatalyst are separated together using a centrifuge operated at 3000 rpm and washed using 100 ml of distilled-water for 1 h multiple-times till the pH of filtrate remains unchanged or neutral. The surface-cleaned magnetic nanocomposite particles are separated from the non-magnetic Pt-deposited nanocrystalline anatase-$TiO_2$ photocatalyst using an external magnetic field. The separated powders are dried in an oven at 80° C. for 12 h. The surface-cleaned magnetic nanocomposite particles are then recycled for the next-cycle of dye-adsorption conducted in the dark-condition. The amount of reactive-dye remaining in the solution, after each dye-adsorption experiments, is monitored via the UV-visible absorption spectrophotometer.

The variation in the UV-visible absorption intensity obtained after the dye-adsorption experiments conducted under the different conditions, as observed for the HTN-γ-$Fe_2O_3$ (10 wt. %) magnetic nanocomposite particles, is presented in FIG. 26(b). The cold reactive dye Red M5B exhibits the characteristic absorbance peak located at ~500 nm. The variation in the intensity of this peak is monitored to judge the relative concentration of dye remaining in the aqueous solution after the dye-adsorption experiments. The intensity of absorbance-peak is higher for the initial dye-solution. The intensity however reduces significantly for the HTN-γ-$Fe_2O_3$ (10 wt. %) magnetic nanocomposite particles during the $1^{st}$ cycle of dye-adsorption. Nevertheless, when the HTN-γ-$Fe_2O_3$ (10 wt. %) magnetic nanocomposite particles with the previously adsorbed-dye is used for the $2^{nd}$ cycle of dye-adsorption, no significant dye-adsorption on the surface is noted. This strongly suggests that after the $1^{st}$ cycle of dye-adsorption, a surface-cleaning treatment is required to decompose the previously adsorbed-dye. Hence, the surface-cleaning treatment is conducted using the combination of Pt-deposited nanocrystalline anatase-$TiO_2$ having the Pt/Ti mole-ratio varying in the range of 1-10% and the UV-radiation exposure. It is observed that the dye-adsorption in the $2^{nd}$ cycle is enhanced considerably following the surface-cleaning treatment. It is further noted that the Pt-deposited nanocrystalline anatase-$TiO_2$ having the Pt/Ti mole-ratio of 10% exhibits the best performance during the surface-cleaning treatment. This has been attributed to both the significant reduction in the interaction between the HTN-$\gamma$-$Fe_2O_3$ (10 wt. %) magnetic nanocomposite particles and the nanocrystalline anatase-$TiO_2$ photocatalyst particles (that is, the minimization of operation of an ion-exchange mechanism in between the two) and enhanced concentration of OH. produced under the UV-radiation exposure due to the photo-induced electron-trapping effect of Pt. The pure nanocrystalline anatase-$TiO_2$ is not effective for the surface-cleaning treatment and increasing the dye-adsorption during the $2^{nd}$ cycle; hence, it is not included in FIG. 26(b) for clarity. It is obvious that the other noble-metals such as Au, Pd, Ag, and others may also work instead of Pt.

Example-12

In this example, the values of different parameters used for the processing of HTN-$\gamma$-$Fe_2O_3$-flyash magnetic composite particles are identical with those already described in the Example 1 except for the following changes. The initial $SnCl_2$ concentration is changed to 20 g·l$^{-1}$. The pure-HTN is replaced with HTN-$\gamma$-$Fe_2O_3$ (10 wt. %) magnetic nanocomposite which are processed using the method as already described in the Example 9. Hence, the final HTN-$\gamma$-$Fe_2O_3$-flyash magnetic composite particles contain ~1 wt. % $\gamma$-$Fe_2O_3$ and ~8 wt. % HTN (balance being the weight of $Sn^{2+}$-sensitized flyash particles).

The TEM image and EDX spectrum obtained using the magnetic HTN-$\gamma$-$Fe_2O_3$-flyash composite particles, containing ~1 wt. % $\gamma$-$Fe_2O_3$ and ~8 wt. % HTN (balance being the weight of $Sn^{2+}$-sensitized flyash particles), are presented in FIGS. 27(a) and 27(b). The comparison of FIG. 27(a) with FIG. 4(b) suggests the additional presence of magnetic $\gamma$-$Fe_2O_3$ nanoparticles on the surface of flyash particles which are pre-anchored to the HTN via the ion-exchange process operating under the dark-condition in an aqueous solution. This is further supported by the EDX analysis which shows (after the comparison with FIG. 3(a)) an increase in the relative intensities of Ti and Fe on the surface of as-received flyash particles. The magnetic $\gamma$-$Fe_2O_3$ nanoparticles provide the magnetic property; while, the HTN provide an enhanced dye-adsorption capacity to the composite particle. Thus, the processing of flyash-based magnetic dye-adsorbent composite is successfully demonstrated in this example.

The effect of vertically held magnet (M) on the as-received flyash particles and magnetic HTN-$\gamma$-$Fe_2O_3$-flyash composite particles, containing ~1 wt. % $\gamma$-$Fe_2O_3$ and ~8 wt. % HTN (balance being the weight of $Sn^{2+}$-sensitized flyash particles), is compared in FIG. 28. As indicated by the arrows, the magnetic HTN-$\gamma$-$Fe_2O_3$-flyash composite particles strongly adhere to the vertically held magnet, FIG. 28(b), relative to that exhibited by the as-received flyash particles, FIG. 28(a). This strongly suggests that the HTN-$\gamma$-$Fe_2O_3$-flyash composite particles, containing ~1 wt. % $\gamma$-$Fe_2O_3$ and ~8 wt. % HTN (balance being the weight of $Sn^{2+}$-sensitized flyash particles), can be separated from an aqueous solution using an external magnetic field which Is useful in the dye-removal application. Very weak magnetic property is also possessed by the as-received flyash particles possibly due to the presence of small amount of $Fe_2O_3$ in their structure, which is however not strong enough for their separation from an aqueous solution using an external magnetic field.

The as-received flyash particles and the HTN-$\gamma$-$Fe_2O_3$-flyash magnetic composite particles, containing ~1 wt. % $\gamma$-$Fe_2O_3$ and ~8 wt. % HTN (balance being the weight of $Sn^{2+}$-sensitized flyash particles), are then utilized in the MB dye-adsorption experiments, conducted in the dark-condition, as described earlier in the Example-2 except that the initial MB dye concentration of 7.5 µM is used in this example. The variation in the normalized concentration of surface-adsorbed MB dye as a function of contact time, as obtained for the as-received flyash particles and HTN-$\gamma$-$Fe_2O_3$-flyash magnetic composite particles, containing ~1 wt. % $\gamma$-$Fe_2O_3$ and ~8 wt. % HTN (balance being the weight of $Sn^{2+}$-sensitized flyash particles), is presented and compared in FIG. 29(a). Relative to the equilibrium MB dye adsorption exhibited by the as-received flyash particles, the amount of MB dye adsorbed at equilibrium is seen to be enhanced due to the anchoring of HTN-$\gamma$-$Fe_2O_3$ nanocomposite to the surface of flyash particles which are pre-sensitized with the $Sn^{2+}$ cations. After the dye-adsorption process, the HTN-$\gamma$-$Fe_2O_3$-flyash magnetic composite particles could be separated from the treated aqueous solution using an external magnetic field, FIG. 29(b).

Thus, the processing of magnetic flyash-based composite particles, having an enhanced dye-adsorption capacity with the ability of magnetic separation, via an innovative approach is successfully demonstrated in this example. It is obvious that the magnetic flyash-based composite particles can be recycled in the dye-removal application using the technique similar to that used for the recycling of semiconductor-oxide nanotubes-metal oxide magnetic nanocomposite particles as demonstrated in the Example-11.

Example-13

In this example, the HTN-SnO composite particles are synthesized via an innovative approach involving an ion-exchange mechanism operating under the dark-condition in an aqueous solution. As demonstrated in the Example 1, $Sn^{2+}$ cations can be used as the surface-sensitizer for the as-received flyash particles to anchor the HTN to their surfaces. Since SnO is the oxide of $Sn^{2+}$ cations, the surface-sensitization step is not necessary and may be eliminated to anchor the HTN to the surface of SnO via an ion-exchange mechanism operating under the dark-condition in an aqueous solution.

To demonstrate this, 0.9 g of SnO particles (Sigma-Aldrich Chemicals, Bangalore, India) are dispersed in 100 ml of distilled-water under the continuous overhead stirring at 25° C. for 10 min. 0.1 g of hydrothermally processed HTN are then added to the above suspension under the continuous overhead stirring at 25° C. for 10 min. The resulting suspension is sonicated for 10 min and then stirred continuously under the dark-condition for 1 h using an overhead stirrer. The nano-nano integrated (10 wt. %) HTN-SnO composite particles, thus formed, are separated from the aqueous solution using a centrifuge operated at 3000 rpm, washed using 100 ml of distilled-water for 1 h multiple-times till the pH of filtrate remains unchanged or neutral, again separated from the aqueous solution via centrifuging, and then dried in an oven at 80° C. for 12 h to obtain the (10 wt. %) HTN-SnO composite particles.

The TEM image and EDX analysis of the (10 wt. %) HTN-SnO composite particles, processed via ion-exchange mechanism operating under the dark-condition in an aqueous solution, are presented in FIGS. 30(a) and 30(b) respectively. The corresponding SAED pattern is shown as an inset in FIG. 30(a). The anchoring of HTN at the shorter tube-edges (tube-openings) to the surface of SnO particle is clearly visible. Thus, the formation of (10 wt. %) HTN-SnO composite particles processed via an ion-exchange mechanism, operating under the dark-condition in an aqueous solution, without the involvement of surface-sensitization step is successfully demonstrated.

ADVANTAGES OF THE INVENTION

1. It provides the innovative semiconductor-oxide nanotubes-based composite products (both magnetic and non-magnetic).
2. It provides the innovative methods for the processing of semiconductor-oxide nanotubes-based composite products (both magnetic and non-magnetic).
3. It provides a new industrial application to the innovative semiconductor-oxide nanotubes-based composite products (both magnetic and non-magnetic), typically the industrial dye-removal from the aqueous solutions.
4. It provides an innovative approach to increase the specific surface-area of flyash without affecting its spherical morphology.
5. It provides an innovative method to recycle the semiconductor-oxide nanotubes-based products (both magnetic and non-magnetic) used in the industrial dye-removal application.
6. It provides an innovative solution for tackling the handling, disposal, and recycling issues associated with the flyash without and with the surface-adsorbed metal-cations.

What is claimed is:

1. A nanocomposite particle consisting of:
   (i) magnetic metal-oxide nanoparticles in a range of 5-50 wt. %; wherein the magnetic metal-oxide nanoparticles are γ-Fe2O3 or Fe3O4; and
   (ii) nanotubes of semiconductor-oxides in a range of 50 95 wt. % attached to the surface of the magnetic metal-oxide nanoparticles at the short-edges (tube-openings), wherein the nanotubes of semiconductor-oxide are attached to the surfaces of magnetic metal-oxide nanoparticles via ion-exchange mechanism operating under the dark-condition in an aqueous solution; and wherein the nanotubes of semiconductor-oxide are hydrothermally processed hydrogen titanate (HTN); and wherein the hydrothermally processed hydrogen titanate is obtained by dispersing a nanocrystalline $TiO_2$ in an alkaline aqueous solution followed by autoclaving, washing, and centrifuging with subsequent drying at 80° C. for 12 hours; and wherein the hydrothermally processed hydrogen titanate is obtained without calcination;
   wherein the nanocomposite particle does not comprise an intermediate insulating layer between the magnetic metal-oxide nanoparticles and the nanotubes; and
   wherein the nanocomposite particle is characterized to function under dark condition in an aqueous solution.

2. The nanocomposite particle of claim 1, which is useful for an application involving dye-removal from an aqueous solution and industry-effluent via surface-absorption mechanism operating in a dark-condition.

3. The nanocomposite particle of claim 1, wherein more of the nanotubes are attached to the surface of the magnetic metal-oxide nanoparticles at the short-edges (tube-openings) than along the length of the nanotubes.

4. The nanocomposite particle of claim 1, wherein the HTN is selected from the group consisting of $H_2Ti_3O_7$, or lepidocrocite.

5. A process for a surface-cleaning and a recycling of the nanocomposite particle of claim 2 after an adsorption of an organic synthetic-dye from an aqueous solution via a surface-adsorption mechanism operating in a dark-condition, comprising:
   (a) suspending 1-30 $g \cdot l^{-1}$ of the nanocomposite particles having the organic synthetic-dye absorbed thereon in water under continuous stirring for a period ranging between 5-30 min at temperature ranging between 20-30° C.;
   (b) suspending a photocatalyst selected from the group of a nanocrystalline anatase-$TiO_2$-coated $SiO_2$/γ-$Fe_2O_3$ magnetic photocatalyst and a noble-metal-deposited nanocrystalline anatase-$TiO_2$ in the suspension obtained in said (a) under continuous stirring, followed by sonicating the suspension for 5-30 min, subsequently stirring the suspension continuously under UV or solar-radiation exposure for 1-10 h;
   (c) centrifuging the solution at 2000-4000 rpm to separate the nanocomposite particles and photocatalyst together, followed by washing using water for 30 min-2 h multiple-times until the pH of filtrate remains unchanged or neutral;
   (d) separating photocatalyst particles from the surface-cleaned nanocomposite particles using an external magnetic field; and
   (e) drying both the photocatalyst particles and nanocomposite particles in an oven at 70-90° C. for 10-15 h for reuse.

6. The process of claim 5, wherein the photocatalyst is suspended at 10-60 wt. % of total weight of suspended solid particles.

7. A process for a preparation of the nanocomposite particle of claim 1, comprising:
   (a) dispersing 0.5-10 $g \cdot l^{-1}$ of the magnetic metal-oxide nanoparticles in water having a neutral solution-pH of about 6.5-7.5 under continuous stirring for 5-30 min at temperature in a range of 20-30° C.;
   (b) adding 0.5-10 $g \cdot l^{-1}$ of hydrothermally processed nanotubes of semiconductor-oxides in the suspension obtained in said (a) under continuous stirring for 5-30 min at temperature in a range of 20-30° C., followed by sonicating the suspension for 5-30 min, subsequently stirring the suspension continuously for 1-10 h in a dark-condition to obtain the nanocomposite particles;
   (c) separating the nanocomposite particles using a centrifuge operated at 2000-4000 rpm or an external magnetic field, followed by washing the nanocomposite particles using water for 30 min-2 h till a pH of filtrate remains unchanged or neutral, followed by separation and drying the nanocomposite particles in an oven at 70-90° C. for 10-15 h.

8. The process of claim 5, wherein the surface-absorbed organic synthetic-dye is present at 0.1-3 $mg \cdot g{-1}$ of nanocomposite particles.

* * * * *